US011206925B2

(12) United States Patent
Parsons et al.

(10) Patent No.: US 11,206,925 B2
(45) Date of Patent: *Dec. 28, 2021

(54) APPARATUS AND METHOD FOR SIMULTANEOUSLY TESTING A PLURALITY OF MOBILE DEVICES

(71) Applicant: Communications Test Design, Inc., West Chester, PA (US)

(72) Inventors: Gerald J. Parsons, Chester Springs, PA (US); Leo D. Parsons, Chester Springs, PA (US); Michael P. Parsons, West Chester, PA (US); Nidhin Davis, Avondale, PA (US); Matthew Parsons, Glenmoore, PA (US); Sean Parsons, West Chester, PA (US); Mohammad R. Paknejad, Glenmoore, PA (US); Andrew Sieben, Wilmington, DE (US); Aaron Santangelo, Pottstown, PA (US); John Goldman, Elverson, PA (US); David Beasley, Thornton, PA (US); Nick Gamber, Woolwich, NJ (US)

(73) Assignee: Communications Test Design, Inc., West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,975

(22) Filed: Apr. 3, 2020

(65) Prior Publication Data

US 2020/0245763 A1     Aug. 6, 2020

Related U.S. Application Data

(63) Continuation of application No. 16/179,299, filed on Nov. 2, 2018, now Pat. No. 10,646,037, which is a
(Continued)

(51) Int. Cl.
*A47B 88/407* (2017.01)
*A47B 87/00* (2006.01)
*H04M 1/24* (2006.01)

(52) U.S. Cl.
CPC ............ *A47B 88/407* (2017.01); *A47B 87/00* (2013.01); *H04M 1/24* (2013.01)

(58) Field of Classification Search
CPC ......... A47B 88/407; A47B 87/00; H04M 1/24
(Continued)

(56) References Cited

U.S. PATENT DOCUMENTS 10,188,207 B2 * 1/2019 Parsons .................. A47B 87/00
2003/0109224 A1   6/2003 Tolonen
(Continued)

FOREIGN PATENT DOCUMENTS

CN       102121971 A       7/2011

*Primary Examiner* — Ayodeji O Ayotunde
(74) *Attorney, Agent, or Firm* — Duane Morris LLP

(57) ABSTRACT

An apparatus and method for simultaneously testing a plurality of mobile devices is disclosed. The method for simultaneously testing a plurality of mobile devices generally includes simultaneously executing a test mobile device application on the plurality of mobile devices, determining test mobile device application results for the plurality of mobile devices at a plurality of test computers, sending a test mobile device application results from the plurality of mobile devices to the plurality of test computers, and deleting the test mobile device application on the plurality of mobile devices.

24 Claims, 17 Drawing Sheets

Related U.S. Application Data continuation of application No. 15/409,047, filed on Jan. 18, 2017, now Pat. No. 10,188,207.

(60) Provisional application No. 62/312,276, filed on Mar. 23, 2016.

(58) Field of Classification Search
USPC .......................................................... 455/557
See application file for complete search history.

(56) References Cited

U.S. PATENT DOCUMENTS

| | | |
|---|---|---|
| 2007/0091187 A1 | 4/2007 | Lin |
| 2007/0281734 A1 | 12/2007 | Mizrachi |
| 2009/0028424 A1 | 1/2009 | Sato |
| 2009/0145208 A1 | 6/2009 | Coudert |
| 2012/0281373 A1 | 11/2012 | Bohannon et al. |
| 2016/0187876 A1 | 6/2016 | Diperna |
| 2016/0381818 A1 | 12/2016 | Mills |

\* cited by examiner

Actual RGB values compared to a center questionable
pixel in an exemplary embodiment of the invention

| 125, 125, 200 (A11) | 150, 175, 175 (A12) | 175, 150, 175 (A13) |
|---|---|---|
| 250, 250, 200 (A21) | 150, 200, 200 (A22) | 50, 50, 150 (A23) |
| 100, 150, 150 (A31) | 150, 200, 200 (A32) | 150, 150, 125 (A33) |

FIG. 16

Difference of RGB values compared to the center questionable
pixel in the exemplary embodiment of the invention

| 25,75,0 (B11) | 0,25,25 (B12) | 25,50,25 (B13) |
|---|---|---|
| 100,50,0 (B21) | 150, 200, 200 (B22) | 100,150,50 (B23) |
| 50,50,50 (B31) | 0,0,0 (B32) | 0,50,75 (B33) |

FIG. 17

Actual RGB Values of a good pixel in the
exemplary embodiment of the invention

Difference of RGB values compared to center of a good
pixel in the exemplary embodiment of the invention

APPARATUS AND METHOD FOR SIMULTANEOUSLY TESTING A PLURALITY OF MOBILE DEVICES

CROSS-REFERENCE TO RELATED APPLICATIONS

This application claims the benefit of the filing date under 35 U.S.C. § 119(a)-(d) of U.S. patent application Ser. No. 16/179,299 filed on Nov. 2, 2018, which is a continuation application of U.S. patent application Ser. No. 15/409,047 filed on Jan. 18, 2017, now U.S. Pat. No. 10,188,207 issued on Jan. 29, 2019 which claims priority to Provisional Patent Application No. 62/312,276 filed on Mar. 23, 2016.

FIELD OF THE INVENTION

The invention relates to an apparatus and method for testing mobile devices, and more particularly, to an apparatus and method for simultaneously testing a plurality of mobile devices.

BACKGROUND

Mobile devices, including tablets and phones, have become sophisticated, widespread and pervasive. With the increasing usage of computer network services all over the world, these mobile devices are in great demand. As a result, the cost of used mobile devices has increased. However, as with any used device, the used mobile device needs to be tested to determine operability. As the sizes of mobile devices decrease, and the number of working parts increases, testing of the used mobile device is not only complicated, but also time consuming and expensive.

SUMMARY

An object of the invention, among others, is to provide an apparatus and method to simultaneously test a plurality of mobile devices. The method for simultaneously testing a plurality of mobile devices generally includes simultaneously executing a test mobile device application on the plurality of mobile devices, determining test mobile device application results for the plurality of mobile devices at a plurality of test computers, sending a test mobile device application results from the plurality of mobile devices to the plurality of test computers, and deleting the test mobile device application on the plurality of mobile devices.

BRIEF DESCRIPTION OF THE DRAWINGS

The invention will now be described by way of example with reference to the accompanying figures, of which:

FIG. 16 is a table showing actual RGB values compared to a center questionable pixel in an exemplary embodiment of the invention;

FIG. 17 is table showing difference of RGB values compared to the center questionable pixel in the exemplary embodiment of the invention;

DETAILED DESCRIPTION OF THE EMBODIMENT(S)

Figure 1:
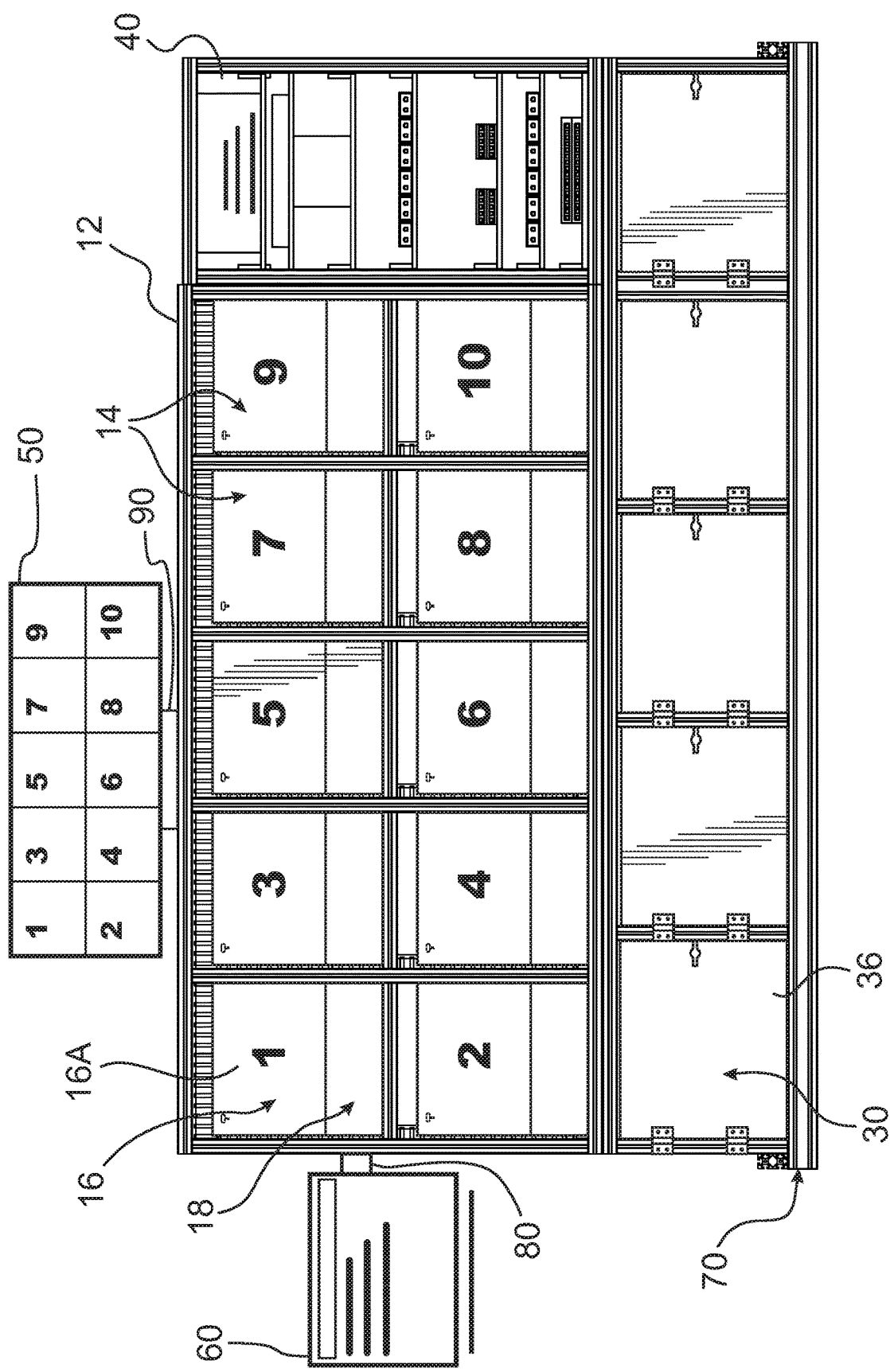
FIG. 1 is a front view of a mobile device testing apparatus according to the invention.

Referring now to the drawings, a mobile device testing apparatus 10 for simultaneously testing a plurality of mobile devices 20 is shown in FIG. 1. While reference throughout will be made to mobile devices 20, it should be understood by one skilled in the art that the invention is not limited to this aspect, and the invention can be used to test other electronic devices.

The mobile device testing apparatus 10, as shown in FIG. 1, is comprised of a frame 12, a plurality of device cabinets 16 having a plurality of drawers 18 for receiving mobile devices 20, a plurality of test cabinets 30, a control cabinet 40, a plurality of monitors 50, and a user computer 60. The major components of the invention will now be described in greater detail.

The frame 12, as shown in FIG. 1, is a structure forming a plurality of slots 14. The frame 12 has ten slots 14 in the exemplary embodiment shown in FIG. 1, and the invention is described with reference to the simultaneous testing of ten mobile devices 20. One with ordinary skill in the art, however, would understand that the number of slots 14, and correspondingly the number of mobile devices 20 that can be simultaneously tested, may vary based on the application; the frame 12 alternatively could have four or eight slots 14. The frame 12 may be constructed out of any material that provides sufficient rigidity for the mobile device testing apparatus 10, including metals, plastics, and other materials known to those with ordinary skill in the art.

The plurality of device cabinets 16 have a front side 16A and a back side 16B, and are each positioned in one of the plurality of slots 14 of the frame 12. The plurality of device cabinets 16 may be substantially square members, or any shape necessary to fit the slots 14.

Figure 2:
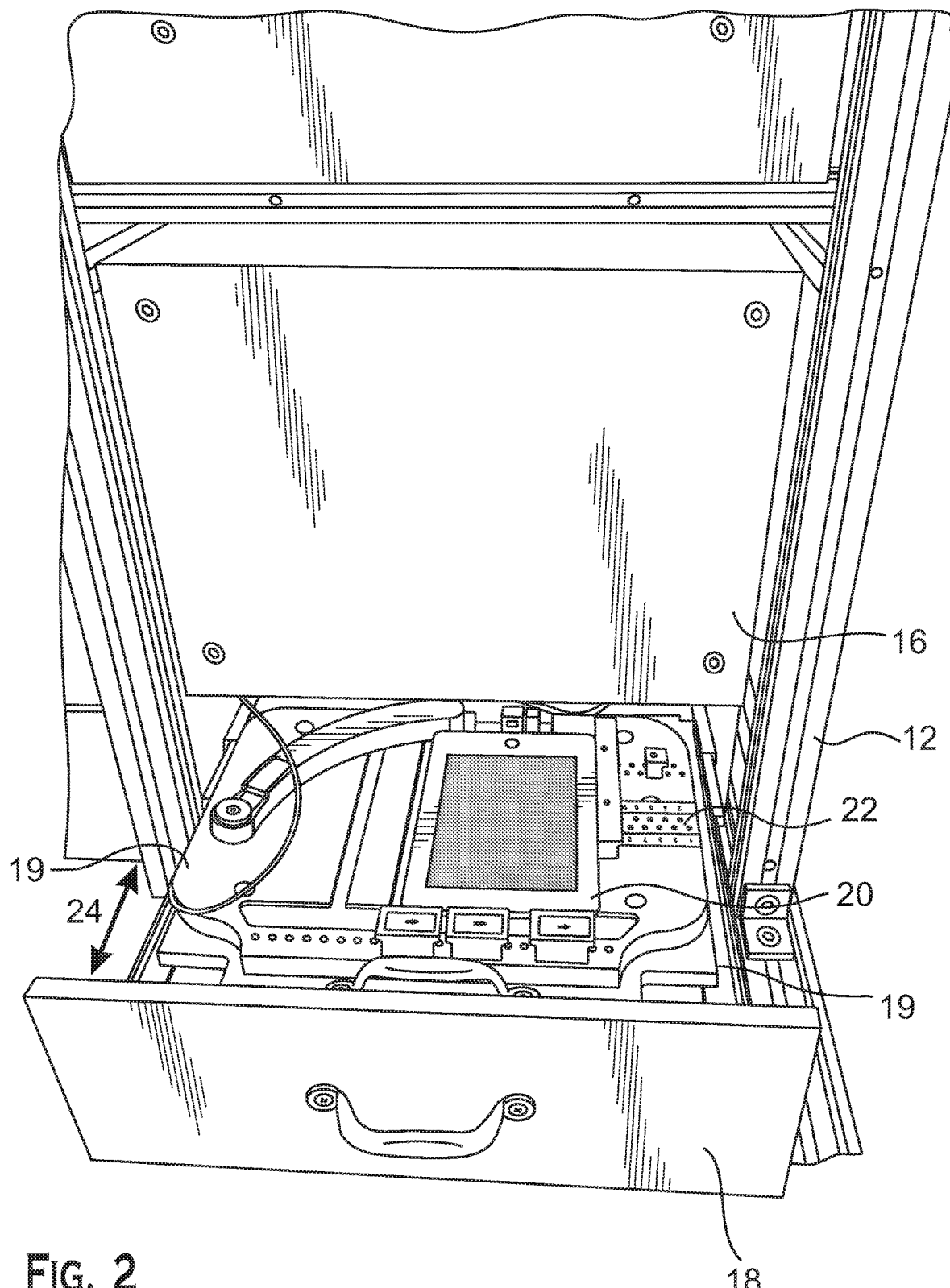
FIG. 2 is a perspective view of a drawer and retention device of the mobile device testing apparatus of FIG. 1.

The front side 16A of the plurality of device cabinets 16 has a plurality of drawers 18 that are moveably or slidably mounted to the frame 12 in the direction 24 shown in FIG. 2; one drawer 18 corresponds to each device cabinet 16, and is approximately positioned on a lower half of the device cabinet 16. Each drawer 18 is slidably mounted to the frame 12 via sliding members 19 shown in FIG. 2. The sliding members 19 may be positioned on both sides of the drawer 18, and may be known slide or glide drawer structures used for drawers and moving shelves. One with ordinary skill in the art would understand that the sliding members 19 could be any structural elements permitting motion of the drawer 18 in relation to the frame 12 and device cabinet 16. The drawer 18 has a closed position in which the drawer 18 is flush with the device cabinet 16, shown in FIG. 1, and an open position, shown in FIG. 2.

Figure 11:
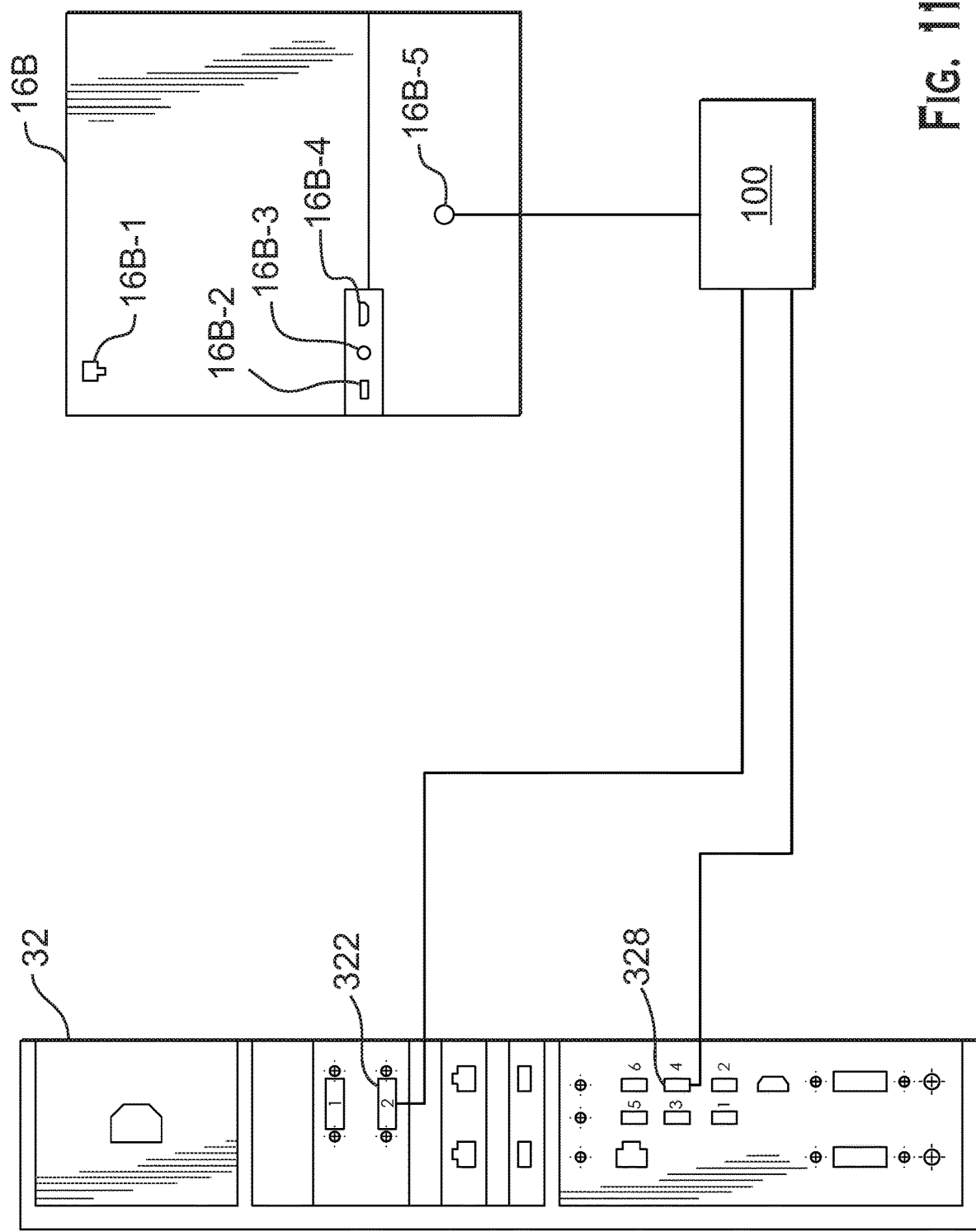
FIG. 11 is a schematic view of connections between a test computer, a device cabinet, and a power supply of the mobile device testing apparatus shown in FIG. 1.

The back side 16B of the plurality of device cabinets 16 is shown in FIG. 11. The back side 16B includes a back side Ethernet port 16B-1, a back side USB port 16B-2, a back side audio port 16B-3, a back side HDMI port 16B-4, and a back side power connector 16B-5. The back side USB port 16B-2 may be a range of known USB connection versions, including USB 1.0, USB 2.0, USB 3.0, and other versions of USB connections known to those with ordinary skill in the art.

As shown in FIG. 2, a retention device 22 is positioned in each drawer 18. The retention device 22 is shown in greater detail in FIG. 3 and is a universal tray. The retention device 22 includes a retention device frame 222, an adjustable guide 224, a plurality of adjustable end walls 226, retention device wall 228, an arm 229, and a retention device connections port 240.

Figure 3:
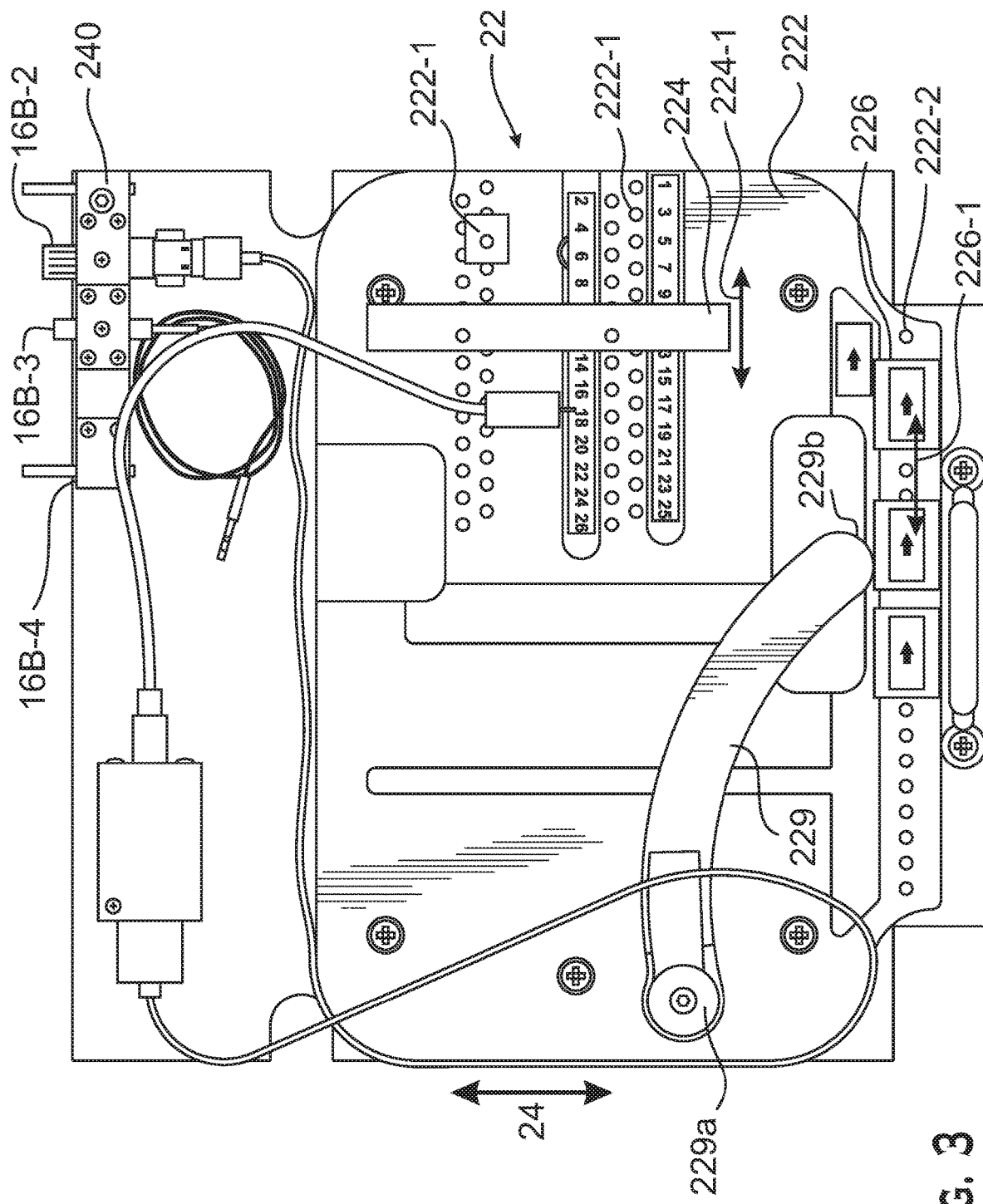
FIG. 3 is a top view of the retention device shown in FIG. 2.

The retention device frame 222 is formed with retention device wall 228, a plurality of guide receiving recesses 222-1, and a plurality of end wall receiving recesses 222-2. The retention device wall 228 may be a stationary member extending parallel to the direction of movement 24, and as shown in the embodiment of FIG. 3, may be positioned approximately centrally within the retention device frame 222. The embodiment shown in FIG. 3 is merely exemplary, and the position of the retention device wall 228 may vary to accommodate various applications and a wider range of mobile device 20 sizes.

The plurality of guide receiving recesses 222-1 extend into the retention device frame 222 and are positioned on one side of the retention device wall 228, extending perpendicularly to the retention device wall 228. In the embodiment shown in FIG. 3, the plurality of guide receiving recesses 222-1 are two rows of staggered circular recesses. One with ordinary skill in the art would understand that the plurality of guide receiving recesses 222-1 could be any form that extends a range of distances from the retention device wall 228 and permits secure connection to an adjustable guide 224.

The plurality of end wall receiving recesses 222-2 extend into the retention device frame 222 and are positioned on one end of the retention device wall 228, extending perpendicularly to the retention device wall 228. In the embodiment shown in FIG. 3, the plurality of guide receiving recesses 222-2 are one row of circular recesses. One with ordinary skill in the art would understand that the plurality of end wall receiving recesses 222-2 could be any form that extends a range of distances along an end of the retention device wall 228 and permits secure connection to an adjustable end wall 226

The adjustable guide 224 is an elongated member positioned to extend parallel to the retention device wall 228, as shown in FIG. 3. The adjustable guide 224 is received and disposed within a subset of the plurality of guide receiving recesses 222-1. The position of the adjustable guide 224 in relation to the retention device wall 228 varies based on which of the subset of the plurality of guide receiving recesses 222-1 are used; the position of the adjustable guide 224 is thus movable in the direction 224-1 shown in FIG. 3.

The plurality of adjustable end walls 226 are substantially square members positioned to extend perpendicular to the retention device wall 228, as shown in FIG. 3. Each adjustable end wall 226 is received and disposed within a subset of the plurality of end wall receiving recesses 222-2. The position of each adjustable end wall 226 in relation to the retention device wall 228 varies based on which of the subset of the plurality of end wall receiving recesses 222-2 are used; the position of each adjustable end wall 226 is thus movable in the direction 226-1 shown in FIG. 3. The plurality of adjustable end walls 226 could also be omitted in some applications.

The retention device 22, along with the retention device wall 228, adjustable guide 224, and plurality of adjustable end walls 226 may be made of nylon, polyurethane, or other plastics. One with ordinary skill in the art would understand that other materials could be used that do not scratch or damage a mobile device when the mobile device contacts the elements during insertion and removal.

The arm 229 has a secure end 229a and a free end 229b, and may be an elongated curved member as shown in FIG. 3. The secure end 229a is positioned at a side of the retention device frame 222 and permits rotation of the arm 229. The free end 229b may rotate substantially across the length of the retention device frame 222 in the direction of movement 224, and may be positioned with the free end 229b between the adjustable guide 224 and the retention device wall 228.

The retention device connections assembly 240 houses the electrical connection ports for the retention device 22. The retention device connections assembly 240 houses the back side USB port 16B-2, the back side audio port 16B-3, and the back side HDMI port 16B-4, as shown in FIG. 3. One with ordinary skill in the art would understand that the specific connections shown in this embodiment are merely exemplary, and that other known electrical connection ports could be positioned within the retention device connections assembly 240 depending on the application.

Figure 4:
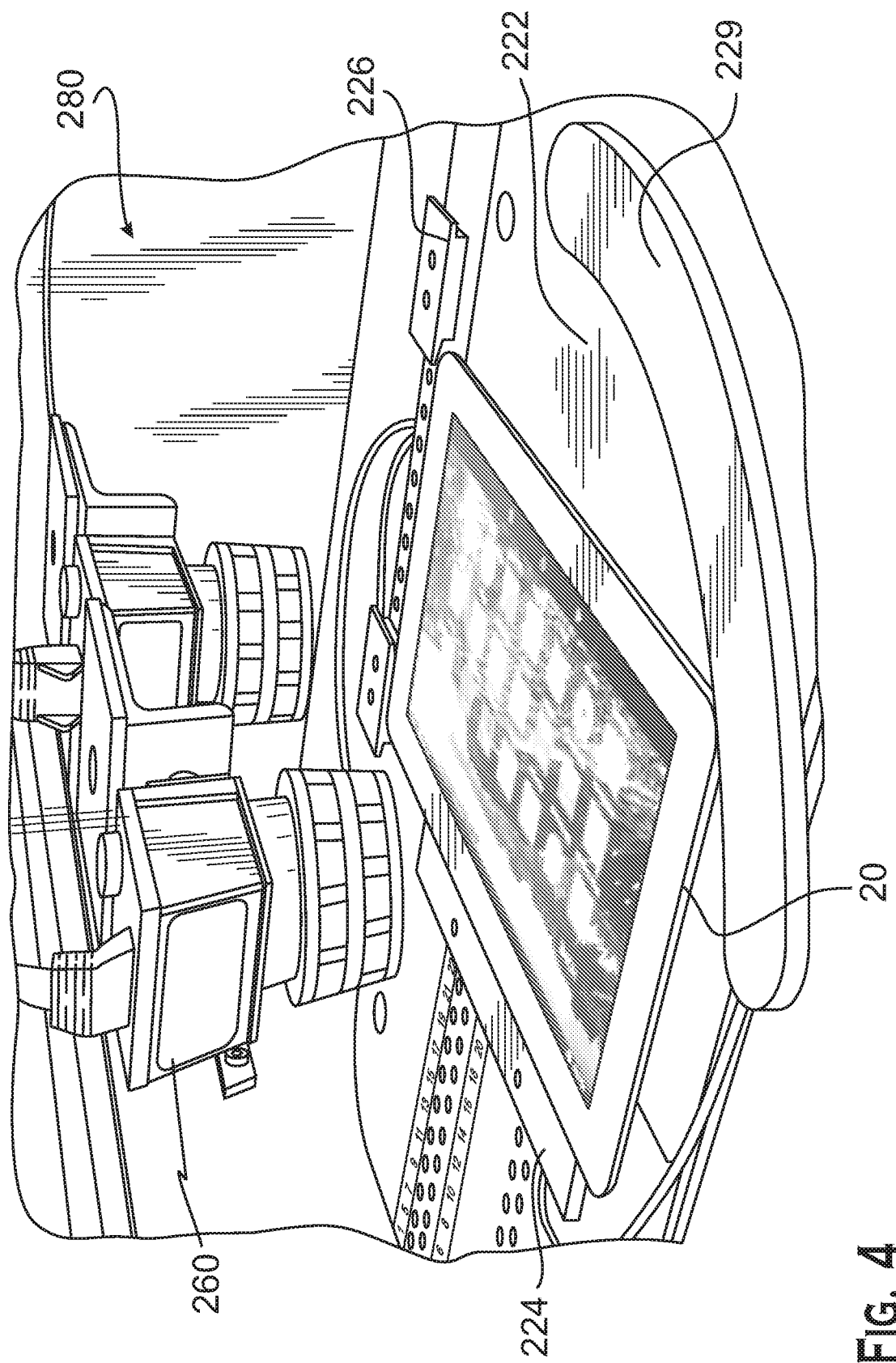
FIG. 4 is a perspective view within a device cabinet of the mobile device testing apparatus of FIG. 1.

The interior of each cabinet 16 may also contain an image recording device 260 and light bars 280 as shown in FIG. 4. The image recording device 260 may be a pair of cameras as shown in the embodiment of FIG. 4, but one with ordinary skill in the art would appreciate that the image recording device 260 could be any device permitting the recording of an image within the cabinet 16. The image recording device 260 is positioned within the cabinet 16 such that it is approximately centered over a space between the adjustable guide 224, the plurality of adjustable end walls 226, the retention device wall 228, and the free end of the arm 229b. The light bars 280 may be an arrangement of any illuminating light elements, including LED lights, incandescent lights, fluorescent lights, and other lights known to those with ordinary skill in the art. The light bars 280 are positioned within the device cabinet 16 such that they can illuminate the retention device 22 and retention device frame 222.

Figure 5:
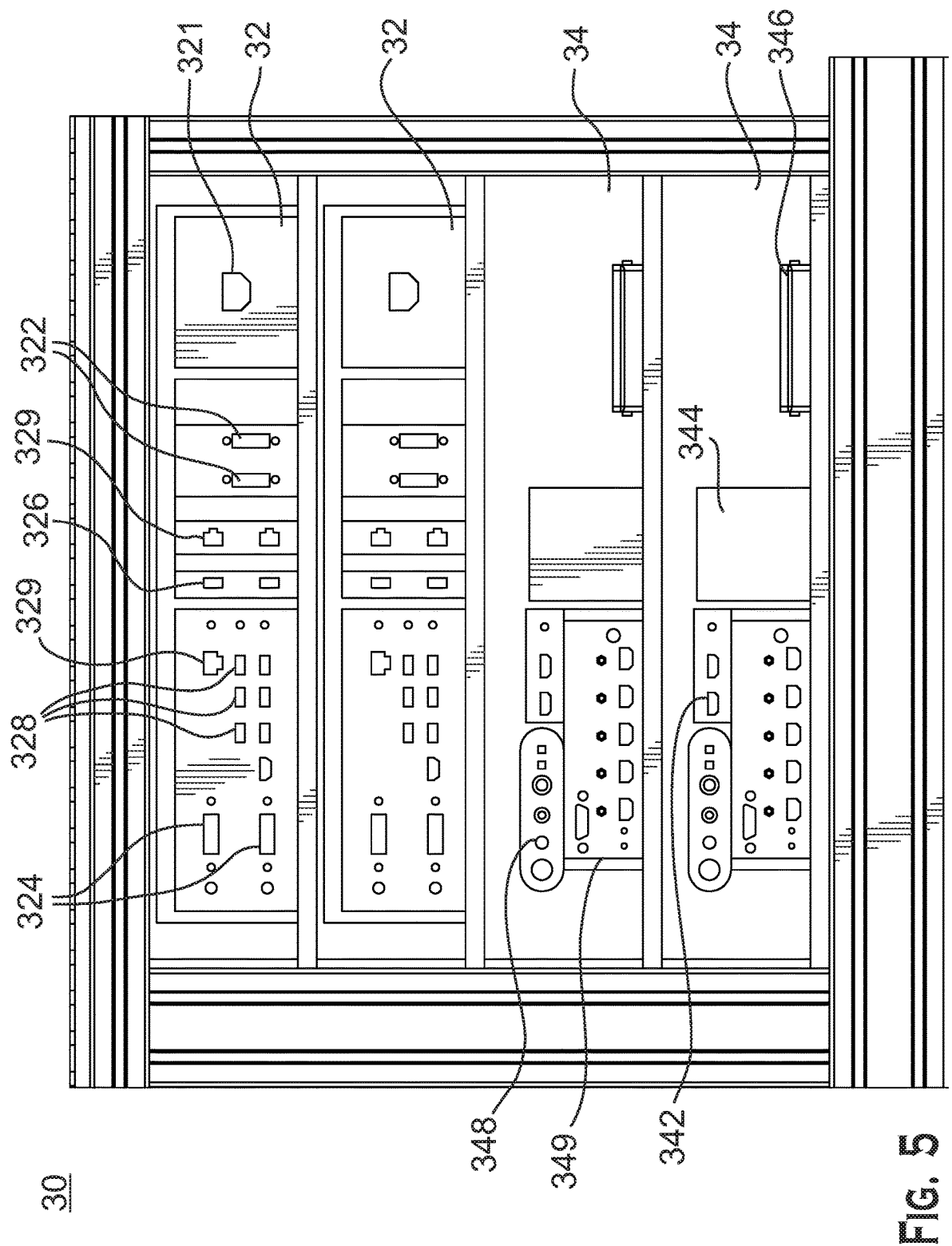
FIG. 5 is a front view of a test cabinet of the mobile device testing apparatus shown in FIG. 1.

An exemplary test cabinet 30 of the plurality of test cabinets 30 is shown in detail in FIGS. 1 and 5. Each test cabinet 30 may have a door 36, shown in FIG. 1, and includes a plurality of test computers 32 and a plurality of control interfaces 34. Each of the plurality of test computers 32 and the plurality of control interfaces 34 may be substantially rectangular members as shown in FIG. 5.

In the embodiment shown in FIGS. 1 and 5, each individual test cabinet 30 houses the test computers 32 and control interfaces 34 that correspond to two device cabinets 16. FIG. 5, for example, depicts a test computer 32 labeled "1" that corresponds to cabinet 16 labeled "1" in FIG. 1, and also depicts a control interface 34 labeled "1" that corresponds to cabinet 16 labeled "1" in FIG. 1. One with ordinary skill in the art would understand that the test cabinet 30 embodiment in FIG. 5 is merely exemplary, each test cabinet 30 could house the test computers 32 and control interfaces 34 for a range of test cabinet 16 quantities. The test computers 32 may be disposed together on top of the control interfaces 34, as shown in the embodiment of FIG. 5, with the numerical progression of corresponding cabinets 16 starting from the top of the test cabinet 30.

Each test computer 32 as shown in FIG. 5 includes a power supply port 321, a plurality of video outputs 322, a plurality of second test serial ports 324, a plurality of first test USB ports 326, a plurality of second test USB ports 328, and a plurality of test Ethernet ports 329 permitting electrical connection to the test computer 32. Both the plurality of video outputs 322 and the plurality of second test serial ports 324 are shown as RS-232 ports in the exemplary embodiment of FIG. 5, but one with ordinary skill in the art would understand that the first and second test serial ports 322, 324 may be other ports permitting electrical connection to a computer known to those with ordinary skill in the art. Both the plurality of first test USB ports 326 and the plurality of second test USB ports 328 may be a range of known USB connection versions, including USB 1.0, USB 2.0, USB 3.0, and other versions of USB connections known to those with ordinary skill in the art. The plurality of test Ethernet ports 329 may be any port known to those with ordinary skill in the art that permits connection to an Ethernet cable.

Each control interface 34 has a processor and includes an HDMI converter 342, a control serial connector 344, an audio and audio video connector 346, a composite converter 348, and an HDMI switch 349.

Figure 10:
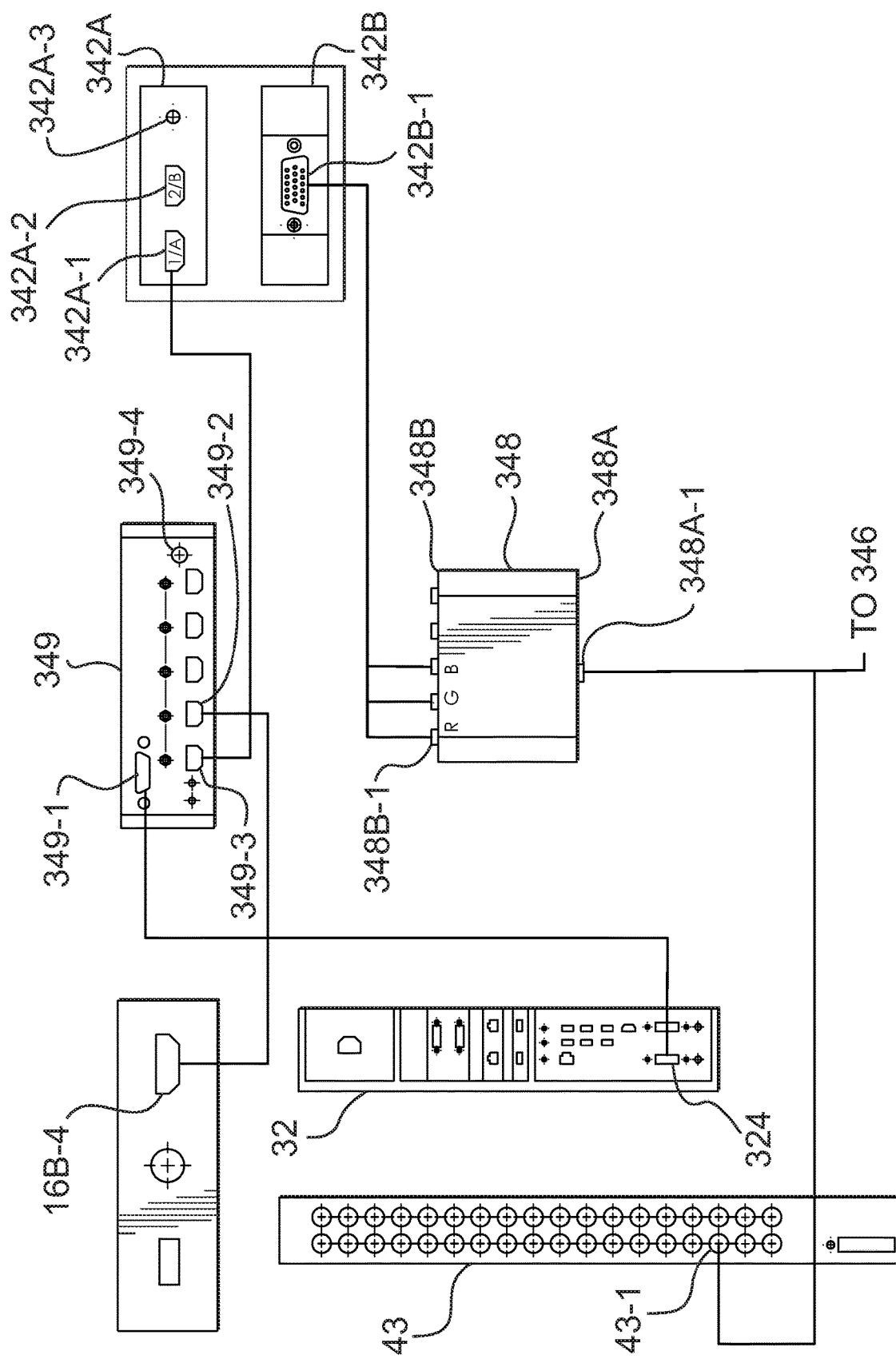
FIG. 10 is a schematic view of connections between a device cabinet, an HDMI switch, an HDMI converter, a composite converter, a test computer, and a control cabinet multiplexer of the mobile device testing apparatus shown in FIG. 1.

The HDMI converter 342, as shown in greater detail in FIG. 10, has a front side 342A also shown in the orientation of FIG. 5, and a back side 342B. The front side 341A may have three electrical connection ports 342A-1, 324A-2, and 342A-3. Ports 342A-1 and 342A-2 may be HDMI ports, as shown in the exemplary embodiment of FIG. 10, and port 342A-3 may be a power supply port. One with ordinary skill in the art would understand that the electrical connection port 342A-1, 324A-2, and 342A-3 may be a range of electrical connection ports known to those with ordinary skill in the art. The back side 342B has a component port 342B-1.

The control serial connector 344 may be any known serial connector that permits electrical connection of the control interface 34 to other elements.

Figure 9:
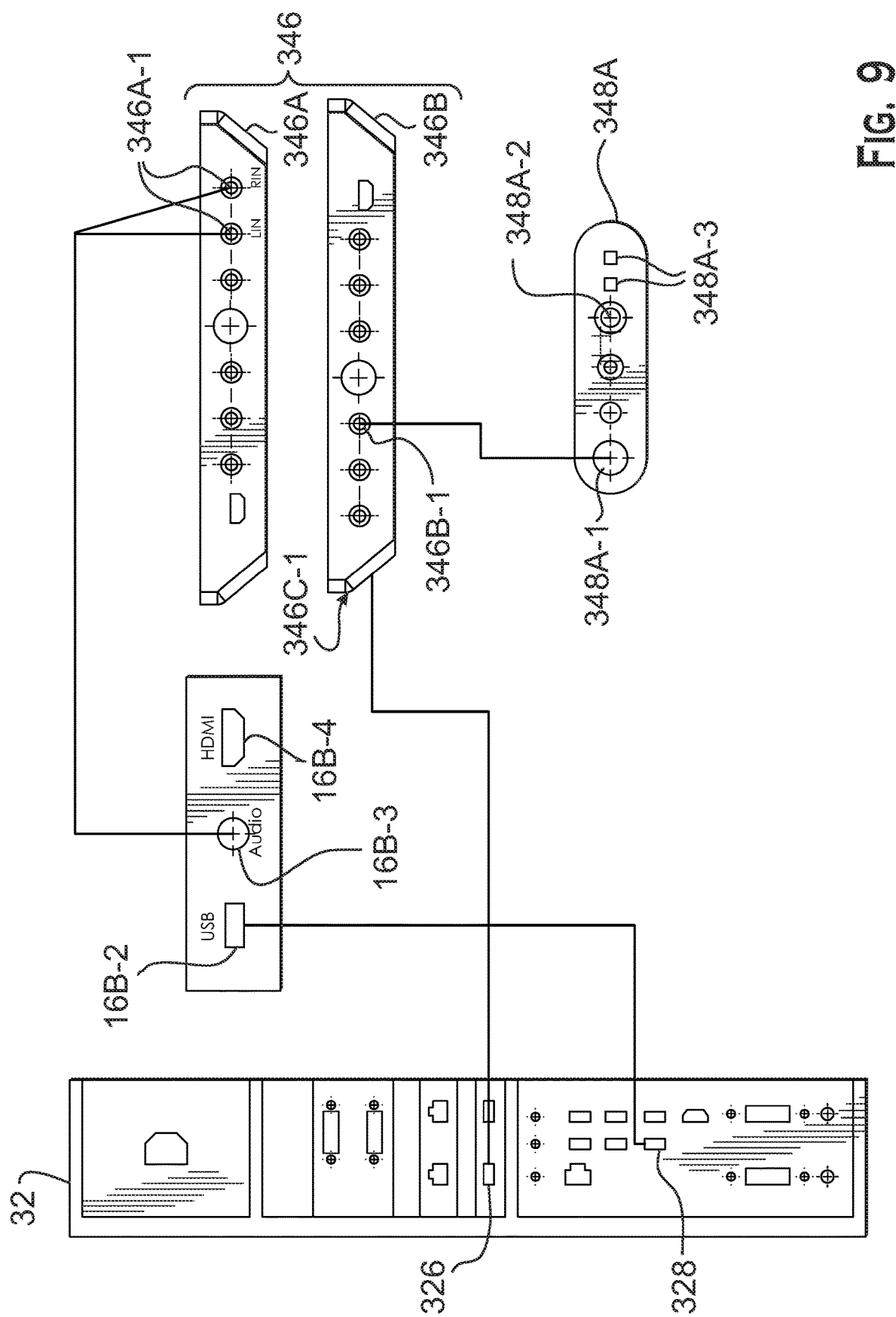
FIG. 9 is a schematic view of connections between a test computer, a device cabinet, an audio video connector, and a composite converter of the mobile device testing apparatus shown in FIG. 1.

The audio and audio video connector 346, as shown in greater detail in FIG. 9, has an input side 346A and an output side 346B. The input side 346A has an audio input port 346-1. In the embodiment shown in FIG. 9, the audio input port 346-1 has two audio inputs corresponding to left and right audio, but one with ordinary skill in the art would understand that a range of possible audio input ports 346-1 could be used. The output side 346B has a video output port 346B-1, and is adjacent to USB output port 346C-1. USB output port 346C-1 may be a range of known USB connection versions, including USB 1.0, USB 2.0, USB 3.0, and other versions of USB connections known to those with ordinary skill in the art.

The composite converter 348, as shown in greater detail in FIGS. 9 and 10, has a front side 348A also shown in the orientation of FIG. 5, and a back side 348B. The front side 348A has CVBS connection port 348A-1, power supply port 348A-2, and a plurality of composite converter switches 348A-3. The back side 348B has electrical connection ports 348B-1. In the exemplary embodiment shown in FIG. 10, the back side electrical connection ports 348B-1 are three RGB ports known in the art. One with ordinary skill in the art would understand that the electrical connection ports of the composite converter 348 may be a range of electrical connection ports known to those with ordinary skill in the art.

The HDMI switch 349 is shown in greater detail in FIG. 10. The HDMI switch 349 has a control serial port 349-1, an HDMI input port 349-2, an HDMI output port 349-3, and a power supply port 349-4. The control serial port 349-1 is shown as an RS-232 port in the exemplary embodiment of FIGS. 5 and 10, but one with ordinary skill in the art would understand that the control serial port 349-1 may also be any port permitting electrical connection to a computer known to those with ordinary skill in the art.

Figure 14:
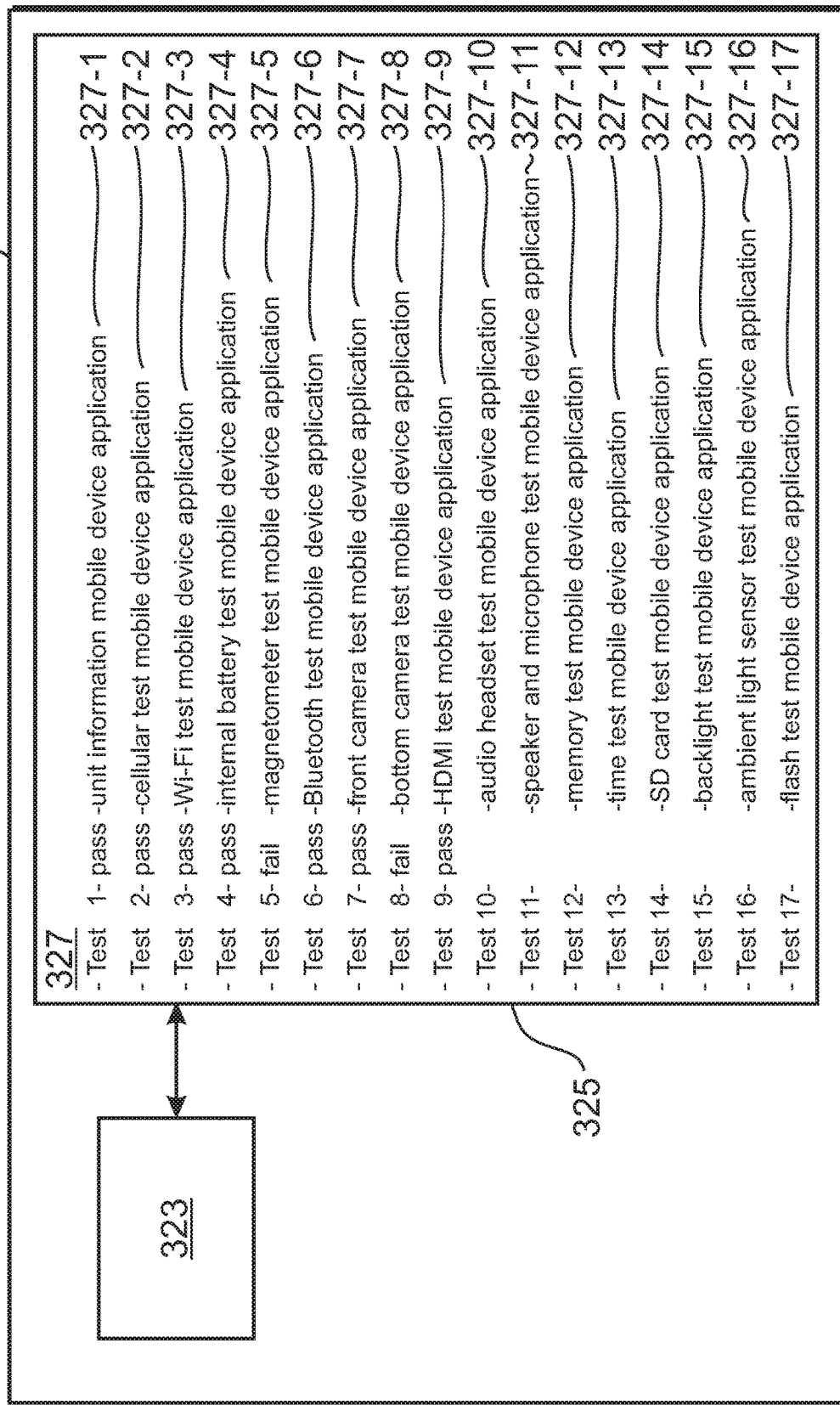
FIG. 14 is a schematic diagram of a test computer of the mobile device testing apparatus shown in FIG. 1.

Each test computer 32 also has a processor 323 and a non-transitory computer readable storage medium 325 storing a plurality of test mobile device applications 327, as shown in FIG. 14.

Each of the test mobile device applications 327 are mobile device applications including a computer program designed to run on mobile devices, such as smartphones and tablet computers.

In an exemplary embodiment of the invention, the test mobile device applications 327 include a unit information mobile device application 327-1, cellular test mobile device application 327-2, Wi-Fi test mobile device application 327-3, internal battery test mobile device application 327-4, magnetometer test mobile device application 327-5, Bluetooth test mobile device application 327-6, front camera test mobile device application 327-7, bottom camera test mobile device application 327-8, HDMI test mobile device application 327-9, audio headset test mobile device application 327-10, speaker and microphone test mobile device application 327-11, memory test mobile device application 327-12, time test mobile device application 327-13, SD card test mobile device application 327-14, backlight test mobile device application 327-15, ambient light sensor test mobile device application 327-16, and flash test mobile device application 327-17.

Figure 6:
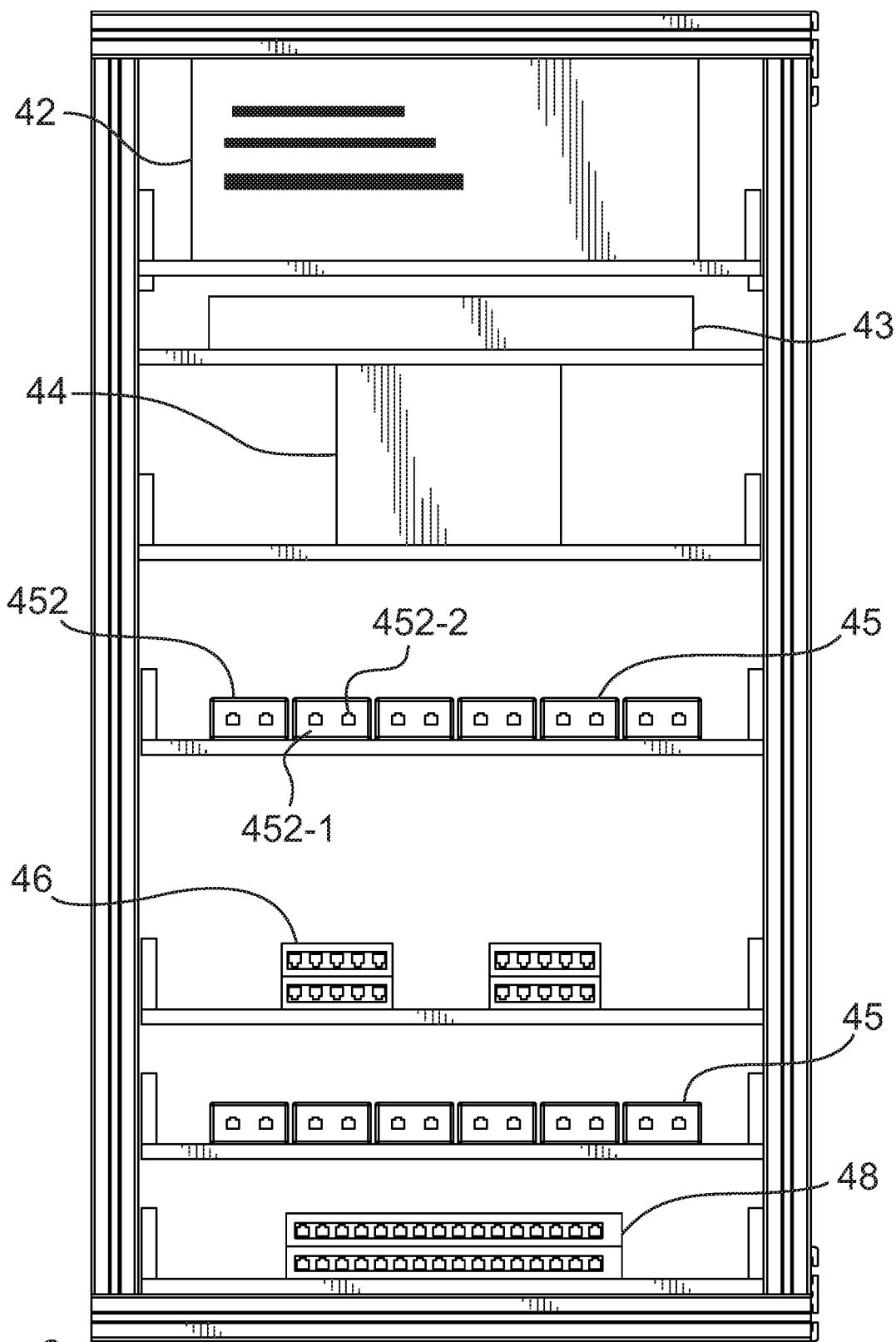
FIG. 6 is a front view of a control cabinet of the mobile device testing apparatus shown in FIG. 1.

The control cabinet 40 is shown in greater detail in FIG. 6. Control cabinet 40 has a control cabinet computer and monitor 42, a control cabinet multiplexer 43, a Wi-Fi router 44, a Ethernet power adapter assembly 45, a first Ethernet switch assembly 46, and a second Ethernet switch assembly 48. As shown in FIG. 6, each of the elements of the control cabinet 40 may be housed in approximately rectangular spaces within the control cabinet 40. In an exemplary embodiment, the cabinet computer 42 may be positioned on top, followed in order by the control cabinet multiplexer 43, the Wi-Fi router 44, the Ethernet power adapter assembly 45, the first Ethernet switch assembly 46, the remainder of the Ethernet power adapter assembly 45, and the second Ethernet switch assembly 48 from top to bottom.

Figure 7:
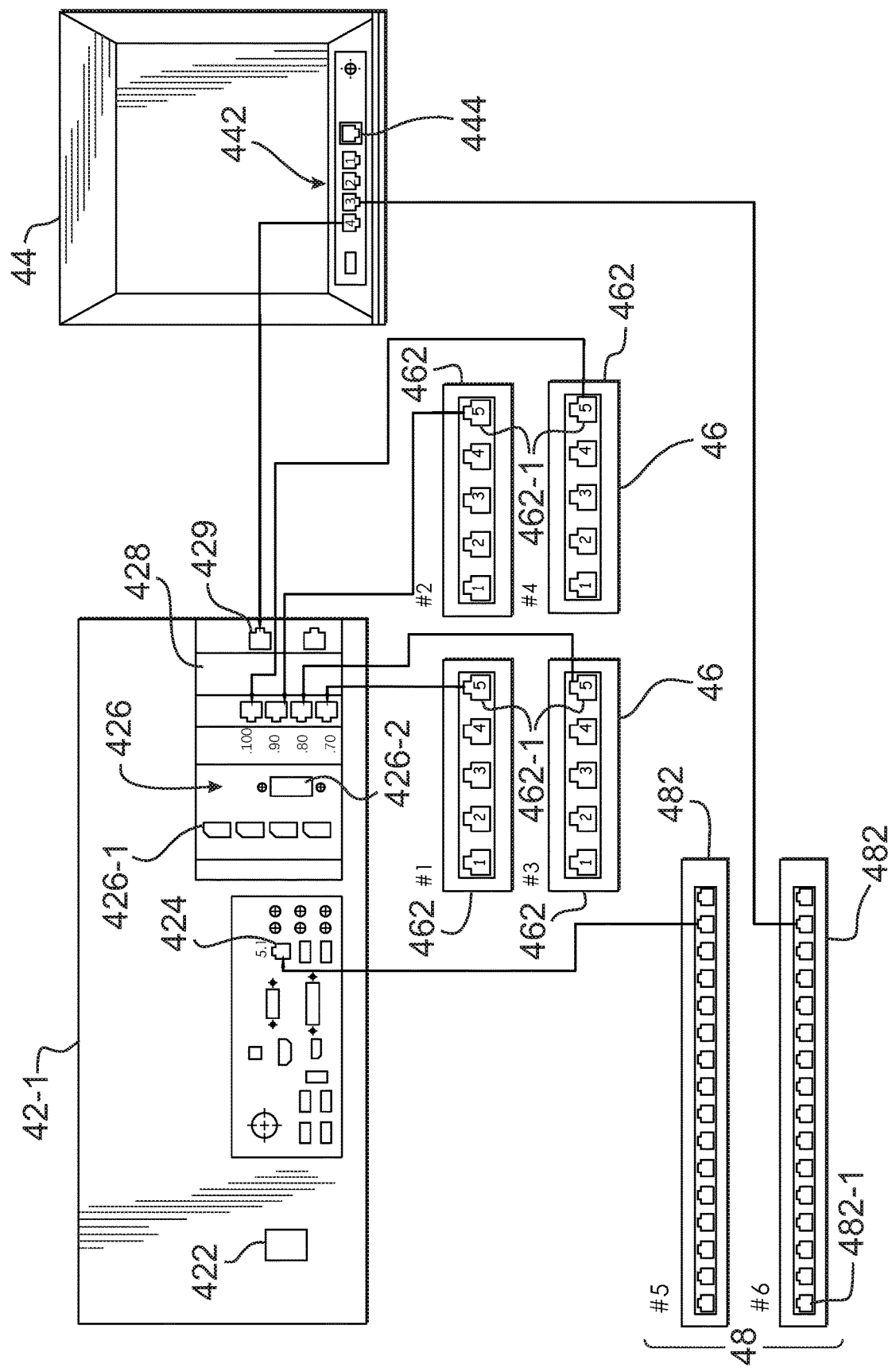
FIG. 7 is a schematic view of connections between a control cabinet computer, a Wi-Fi router, and Ethernet switch assemblies of the mobile device testing apparatus shown in FIG. 1.

The control cabinet computer 42-1 is shown in greater detail in FIG. 7. Control cabinet computer 42-1 has a processor and includes a power supply port 422, a first control computer Ethernet port 424, graphics card ports 426, a plurality of second control computer Ethernet ports 428, and a third control computer Ethernet port 429. The graphics card ports 426 include a plurality of control computer HDMI ports 426-1 and a DVI port 426-2.

Figure 8:
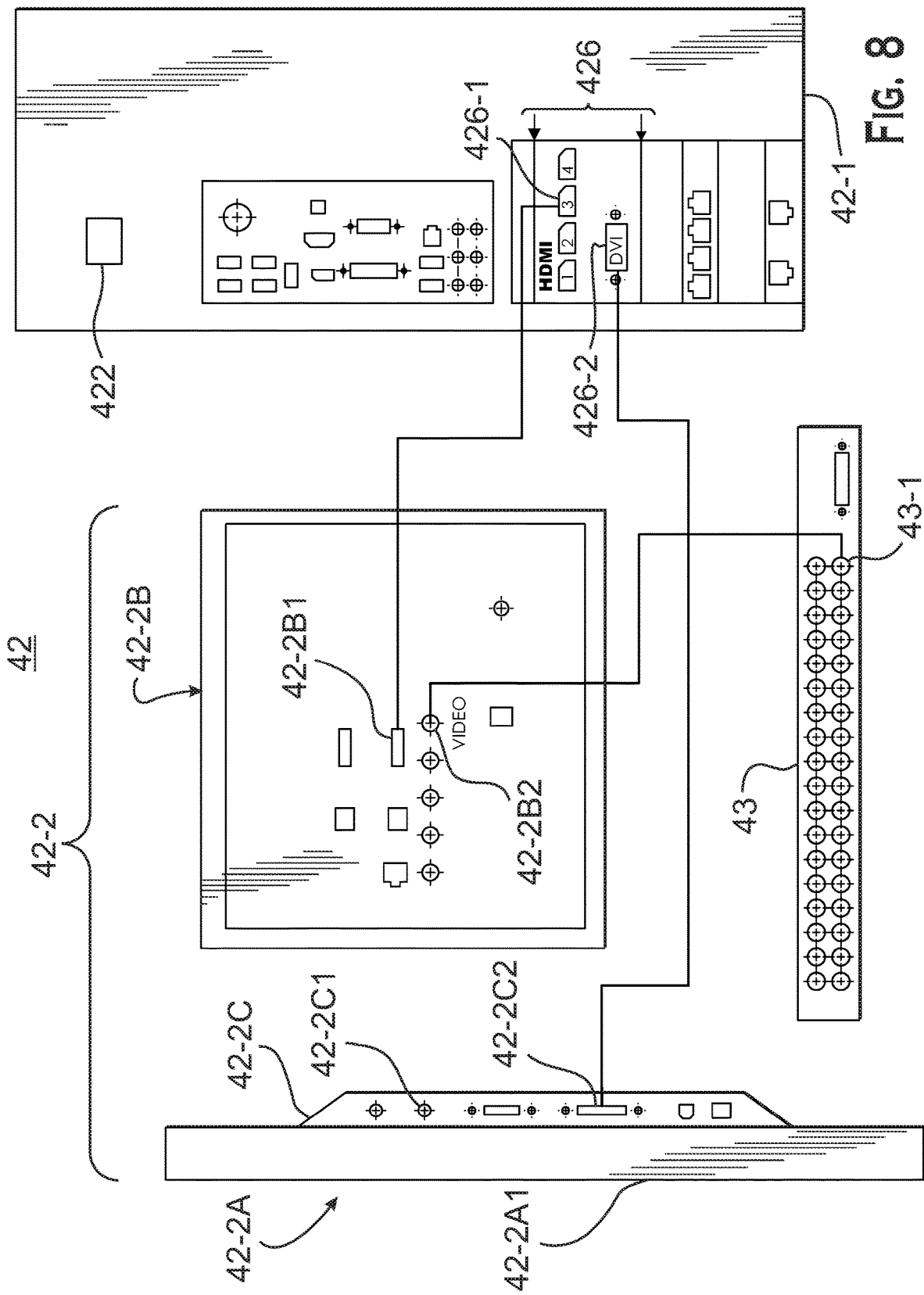
FIG. 8 is a schematic view of connections between the control cabinet computer, a control cabinet multiplexer, and a monitor of the mobile device testing apparatus shown in FIG. 1.

The control cabinet monitor 42-2, as shown in greater detail in FIG. 8, has a front side 42-2A, a back side 42-2B, and a side panel 42-2C. The front side 42-2A of the monitor has a screen 42-2A1, which may be a known touch screen. One with ordinary skill in the art would understand that the front side 42-2A could alternatively be other known forms of screens. The back side 42-2B includes a monitor HDMI port 42-2B1 and a monitor video port 42-2B2. The side panel 42-2C includes a monitor power supply port 42-2C1 and a monitor DVI port 42-2C2.

The control cabinet multiplexer 43 is shown in greater detail in FIG. 8. Control cabinet multiplexer 43 has a plurality of multiplexer ports 43-1.

The Wi-Fi router 44 is shown in greater detail in FIG. 7. The Wi-Fi router 44 includes a plurality of router Ethernet ports 442 and an external Ethernet port 444.

The Ethernet power adapter assembly 45 has a plurality of Ethernet power adapters 452, each having a power adapter input port 452-1 and a power adapter output port 452-2. In the exemplary embodiment shown in FIG. 6, the Ethernet power adapter assembly 45 has two groups of five Ethernet power adapters 45, one corresponding to each device cabinet 16. One with ordinary skill in the art would understand that the number of Ethernet power adapters 452 would vary based on the particular application.

The first Ethernet switch assembly 46 and the second Ethernet switch assembly 48 are shown in greater detail in FIG. 7. The first Ethernet switch assembly 46 has a plurality of first Ethernet switches 462, each having a plurality of first Ethernet ports 462-1. The second Ethernet switch assembly 48 has a plurality of second Ethernet switches 482, each having a plurality of second Ethernet ports 482-1. In the embodiment shown in FIG. 7, the first Ethernet switch assembly 46 has four five-port Ethernet switches 462, such as an FS105 Ethernet switch known in the art. Also in the embodiment shown in FIG. 7, the second Ethernet switch assembly 48 has two sixteen-port Ethernet switches 482, such as an FS116 Ethernet switch known in the art. One with ordinary skill in the art would understand that the first and second Ethernet switch assemblies 46, 48 may vary in number of switches and number of ports per switch, depending on the application.

The plurality of monitors 50 shown in FIG. 1 may be any monitor known to those with ordinary skill in the art capable of playing video. The number of monitors 50 corresponds to the number of device cabinets 16.

Figure 13:
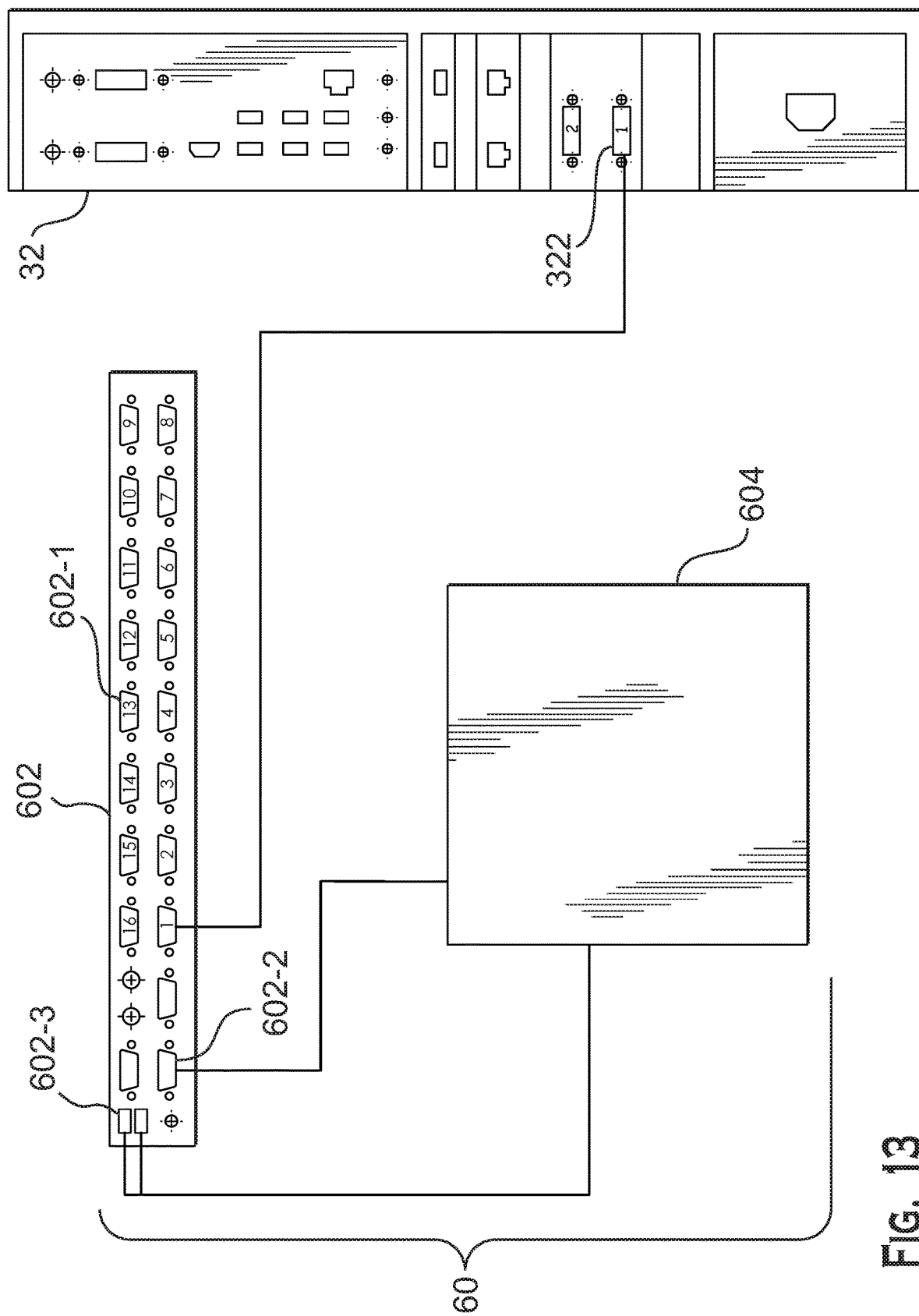
FIG. 13 is a schematic view of connections between a test computer and a test computer of the mobile device testing apparatus shown in FIG. 1.

The user computer 60, as shown in greater detail in FIG. 13, includes a user multiplexer 602 and a output display 604. The user multiplexer 602 has a plurality of first input ports 602-1, a output display output port 602-2, and a plurality of peripheral ports 602-3. In the exemplary embodiment shown in FIG. 13, the user multiplexer 602 has sixteen first input ports 602-1, each first input port 602-1 corresponding to one device cabinet 16. One with ordinary skill in the art would understand that the number of first input ports 602-1 would vary based on the particular application. The plurality of peripheral ports 602-3 are known ports permitting the connection of peripheral devices, such as a keyboard or a mouse (not shown). The output display 604 may be any form of computer monitor known in the art.

The connections and assembly of the mobile device testing apparatus 10 will now be described in greater detail with reference to FIG. 1.

FIG. 1 depicts the general assembly of the frame 12, the plurality of device cabinets 16, the plurality of test cabinets 30, the control cabinet 40, the plurality of monitors 42-2, and the user computer 60. The plurality of test cabinets 30 are disposed on an apparatus base 70 shown in FIG. 1 to form the lowest level of the mobile device testing apparatus 10 structure. The plurality of test cabinets 30 are disposed in a line on the apparatus base 70 and attached to one another. The attachments described herein may include screws, clamps, or any other secure mechanical connection as would be understood by one with ordinary skill in the art.

The frame 12 containing the plurality of device cabinets 16 and the control cabinet 40 are positioned on top of and attached to the plurality of test cabinets 30. This overall assembly of the plurality of test cabinets 30, the apparatus base 70, the frame 12, and the control cabinet 40 forms a substantially rectangular structure of the mobile device testing apparatus 10. The user computer 60 may be attached to a side of mobile device testing apparatus 10 via a first bracket 80. The first bracket 80 securably supports the user computer 60 at a height with respect to the apparatus base 70, and may permit a user to move the user computer 60 in relation to the mobile device testing apparatus 10. The plurality of monitors 42-2 may be attached to the top of the mobile device testing apparatus 10 via a second bracket 90.

The electrical connections of the mobile device testing apparatus 10 will now be described in greater detail with reference to FIGS. 7-13.

FIG. 7 shows the Ethernet connections between the control cabinet computer 42-1, the control cabinet monitor 42-2, the Wi-Fi router 44, the first Ethernet switch assembly 46, and the second Ethernet switch assembly 48. The first control computer Ethernet port 424 is connected to a second Ethernet port 482-1 of a second Ethernet switch 482. A port 482-1 of the other second Ethernet switch 482 is connected to one of the plurality of router Ethernet ports 442. Each of the plurality of second control computer Ethernet ports 428 is connected to one first Ethernet port 462-1 of a first Ethernet switch 462. The third control computer Ethernet port 429 is connected to one of the plurality of router Ethernet ports 442.

FIG. 8 shows the electrical connections between the control cabinet computer and monitor 42, the control cabinet multiplexer 43, and the monitor 42-2. Control computer HDMI port 426-1 is connected to monitor HDMI port 42-2B1. Control computer DVI port 426-2 is connected to monitor DVI port 42-2C2. Monitor video port 42-2B2 is connected to a control cabinet multiplexer port 43-1.

FIG. 9 shows audio and USB electrical connections between a test computer 32, a device cabinet 16, the audio and audio video connector 346, and the composite converter 348. One of the plurality of first test USB ports 326 is connected to the USB output port 346C-1 of the audio and audio video connector 346. One of the plurality of second test USB ports 328 is connected to the a back side USB port 16B-2, and the back side audio port 16B-3 is connected to the audio input port 346A-1 of the audio and audio video connector 346. The video output port 346B-1 is connected to the CVBS connection port 348A-1 of the composite converter 348.

FIG. 10 shows the HDMI electrical connections between a device cabinet 16, the HDMI switch 349, the HDMI converter 342, the composite converter 348, a test computer 32, and the control cabinet multiplexer 43. The back side HDMI port 16B-4 is connected to the HDMI input port 349-2 on the HDMI switch 349. The HDMI output port 349-3 on the HDMI switch 349 is connected to the first HDMI port 342A-1 on HDMI converter 342. The component port 342B-1 on the HDMI converter 342 is connected to the back side electrical connection ports 348B-1 of the composite converter 348. The CVBS connection port 348A-1 of the composite converter 3487, in turn, is connected to both the audio and audio video connector 346 and a multiplexer port 43-1. Lastly, the test computer 32, at one of the second test serial ports 324, is connected to the control serial port 349-1 of the HDMI switch 349.

FIG. 11 shows the electrical connections between a test computer 32, a device cabinet 16, and a power supply 100. The power supply 100 may include a power strip and a power box. One of the second USB test ports 328 and one of the video outputs 322 is connected to the power supply 100. The power supply 100 is connected to the back side power connector 16B-5, which connects to the light bars 280.

Figure 12:
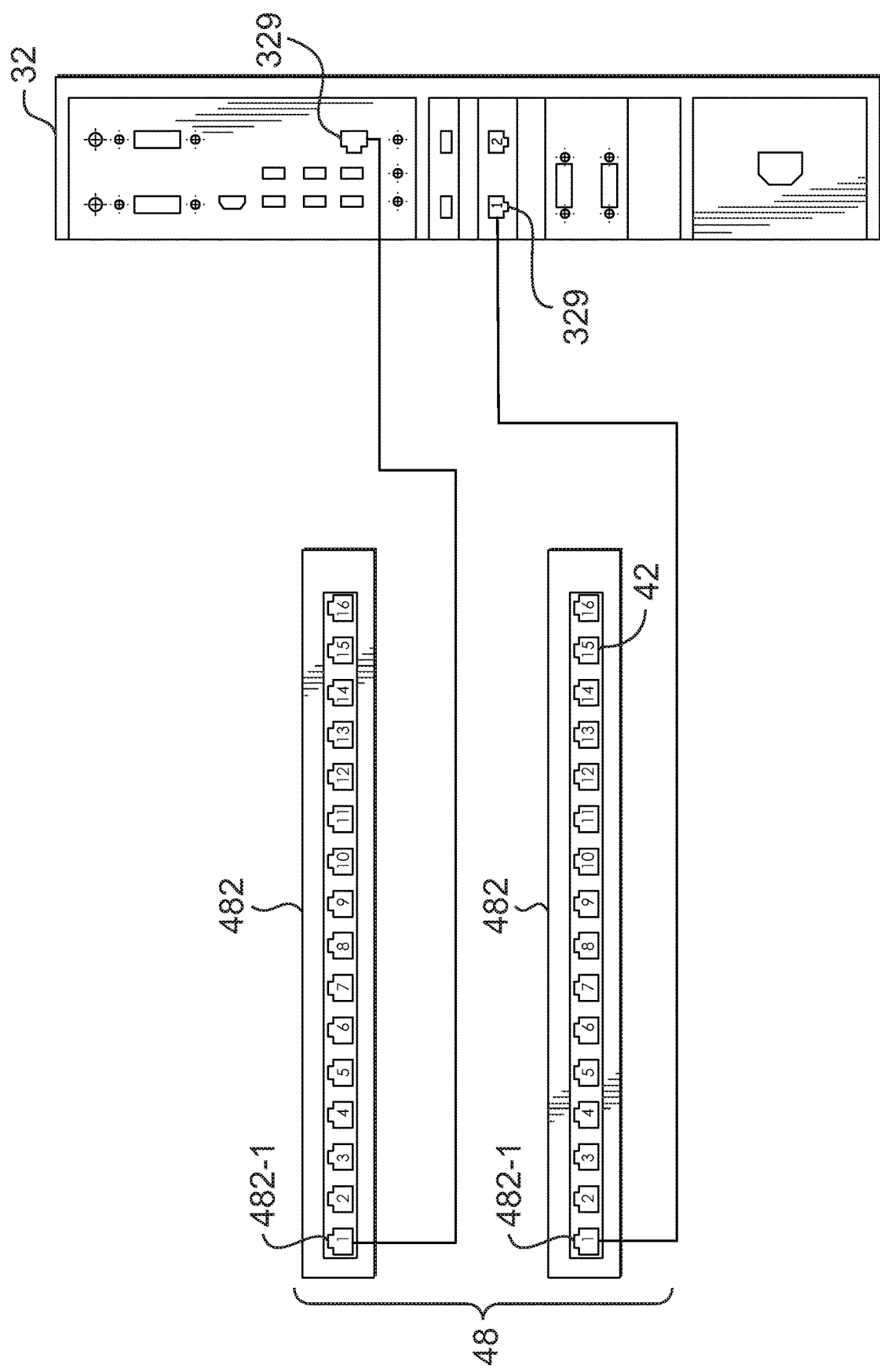
FIG. 12 is a schematic view of connections between a test computer and an Ethernet switch assembly of the mobile device testing apparatus shown in FIG. 1.

FIG. 12 shows the electrical connections between a test computer 32 and the second Ethernet switch assembly 48. One of the plurality of test Ethernet ports 329 is connected to one of the plurality of second Ethernet ports 482-1 of second Ethernet switch 482, while another of the plurality of test Ethernet ports 329 is connected to one of the plurality of second Ethernet ports 482-1 of another second Ethernet switch 482. One of the second Ethernet switches 482 is further connected to the Wi-Fi router 44, while the other of the second Ethernet switches 482 is connected to the control cabinet computer and monitor 42.

FIG. 13 shows the electrical connections between a test computer 32 and the user computer 60. One of the pluralities of video outputs 322 is connected to one of the plurality of first input ports 602-1 of the user multiplexer 602. The output display 604 is connected to the output display output port 602-2.

The use of the mobile device testing apparatus 10 to simultaneously test a plurality of mobile devices 20 will now be described.

A tester first slides the drawer 18 out from the device cabinet 16 in the direction 24, exposing the retention device 22. The tester then places a mobile device 20 within the retention device frame 222, as shown in FIG. 2. The mobile device 20 is held within the retention device frame 222 by the adjustable guide 224, plurality of adjustable end walls 226, retention device wall 228 and arm 229. To accommodate a wide range of mobile devices 20, the adjustable guide 224 is moveable along the guide receiving recesses 222-1 in the direction 224-1 to alter the distance between the adjustable guide 224 and the retention device wall 228, and the adjustable end walls 226 are moveable along the end wall receiving recesses 222-2 in the directions 226-1. The arm 229 is rotatable such that the free end 229*b* abuts an end of the mobile device 20 opposite the plurality of adjustable end walls 226, as shown in FIG. 2.

The positioning of the adjustable guide 224, adjustable end walls 226, and arm 229 permit a variety of mobile devices to be used within the mobile device testing apparatus 10, including tablet computers, smart phones, e-readers, and other electronic mobile devices known to those with ordinary skill in the art. The mobile device 20 is then connected to the retention device connection port 240, which permits the exchange of data between the mobile device 20 and the other elements of the mobile device testing apparatus 10. The above steps may be used to place and connect a mobile device 20 in each device cabinet 16.

Figure 15:
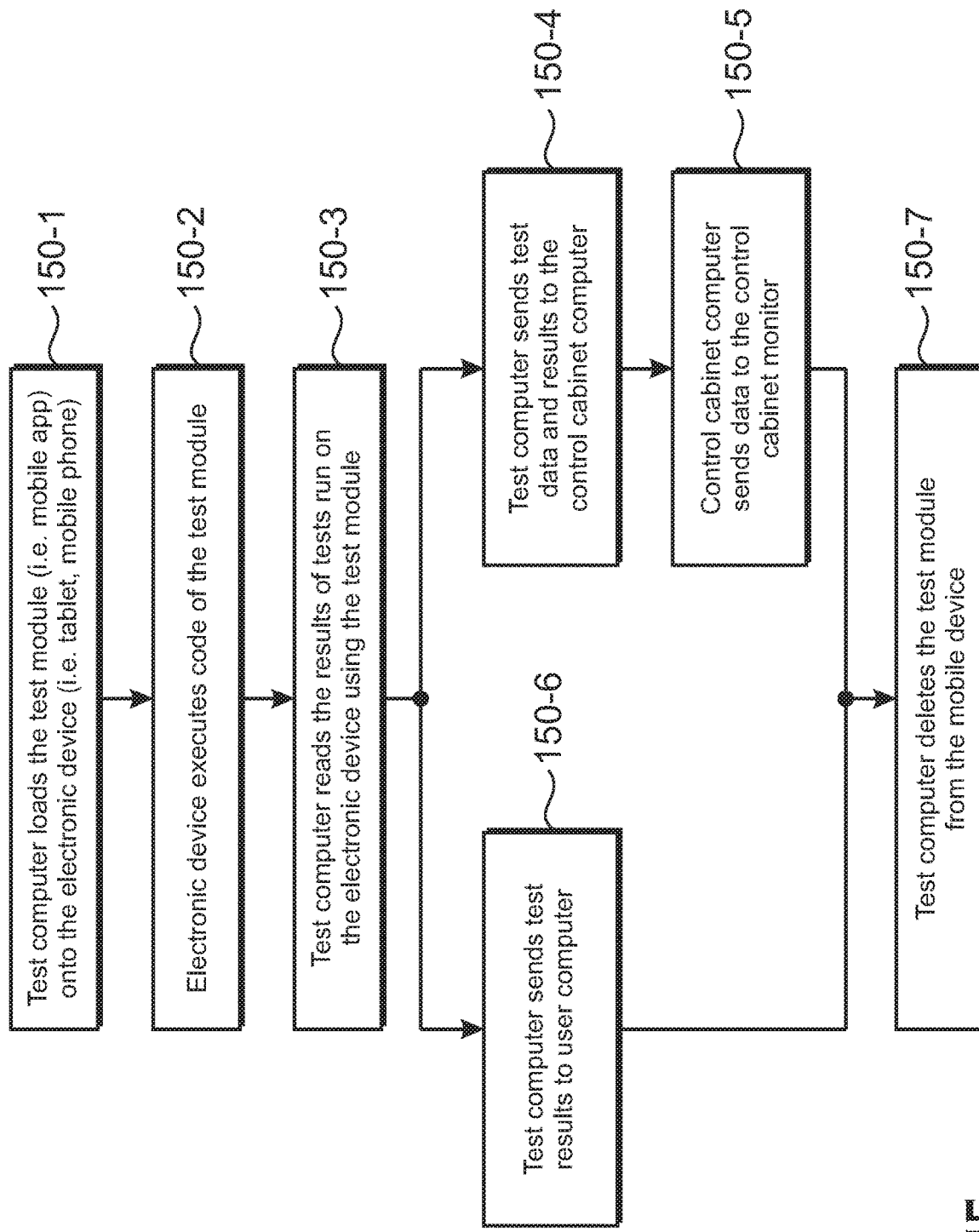
FIG. 15 is a diagram of the steps for executing a testing mobile device application of the mobile device testing apparatus shown in FIG. 1.

A tester operates the mobile device testing apparatus 10 using the user computer 60. Using peripheral devices, the tester manipulates the user computer 60 to select test mobile device applications 327 to run on a mobile device 20 within a device cabinet 16, transmitting data and commands to an individual test computer 32. As shown in FIG. 13, the user computer 60 communicates with a particular test computer 32 via the user multiplexer 602; each of the first input ports 602-1 corresponds to one test computer 32, which each correspond to one device cabinet 16. The test computer 32 executes the test mobile device applications 327 on a mobile device 20 by following the steps shown in FIG. 15.

A test mobile device application 327 executed on one mobile device 20 in one device cabinet 16 will be described, but one with skill in the art would understand that the steps apply to the plurality of device cabinets 16 shown in FIG. 1; a user may simultaneously test a plurality of mobile devices 20 contained within the device cabinets 16 by using the single user computer 60 connected to the plurality of test computers 32. The execution of test mobile device applications 327 as disclosed herein may be used with a range of known mobile device operating systems including android, apple iOS, blackberry, and other operating systems known to those with ordinary skill in the art.

In step 150-1, the test computer 32 pertaining to a particular device cabinet 16 and mobile device 20 loads the test mobile device application 327 onto the mobile device 20. The test computer 32 loads the test mobile device application 327 by transmitting the test mobile device application 327 from the non-transitory computer readable storage medium 325, through one of the plurality of second test USB ports 328, and to the back side USB port 16B-2, as shown in FIG. 9. The mobile device 20 in the device cabinet 16 installs the test mobile device application 327.

In step 150-2, the mobile device 20 executes the test mobile device application 327. The variety of test mobile device applications 327 used within the mobile device testing apparatus 10 will be described in greater detail below. For some test mobile device applications 327, the lights bars 280 are used to illuminate the interior of the device cabinet 16. For these tests, the test computer 32 controls the illumination of the light bars 280 though one of the video outputs 322 and one of the plurality of second test USB ports 328 connecting via the power supply 100. The monitors 50 are each connected to one image recording device 260 inside a device cabinet 16; the monitors 50 show the current testing inside the device cabinet 16 when the light bars 280 are illuminated.

In step 150-3, the test computer 32 reads the results from the device cabinet 16 containing the mobile device 20. The test computer 32 obtains data concerning the tests from one of the plurality of second test USB ports 328 connected to the back side USB port 16B-2, as shown in FIG. 9. The test computer 32 obtains audio concerning the tests from back side audio port 16B-3 connecting through the audio and audio video connector 346 and into one of the plurality of first test USB ports 326, as shown in FIG. 9. The test computer 32 obtains video concerning the tests from back side HDMI port 16B-4 connected through the HDMI switch 349 into one of the second test serial ports 324, as shown in FIG. 10.

In step 150-4, the test computer 32 sends the test data and results to the control cabinet computer and monitor 42. As shown in FIG. 10, HDMI video is sent to the control cabinet computer and monitor 42 through the HDMI switch 349, then passing through the HDMI converter 342 which converts the HDMI into component RGB, through the composite converter 348, and through a CVBS connection to one of the multiplexer ports 43-1 corresponding with the number of the test computer 32. The test computer 32 also sends data to the control cabinet computer and monitor 42 via an Ethernet connection shown in FIG. 12. Data is passed from the plurality of test Ethernet ports 329 to a second Ethernet ports 482-1 on a second Ethernet switch 482 corresponding to the number of the test computer 32. The second Ethernet switches 482 then send the data to the control cabinet computer and monitor 42 as shown in FIG. 7 and described in the connections above.

In step 150-5, the control cabinet computer 42-1 sends data to the control cabinet monitor 42-2 as shown in the connections in FIG. 8.

In step 150-6, the test computer 32 sends the test results to the user computer 60 via the connection from one of the Ethernet ports 329. The test computer displays results corresponding to the number of the device cabinet 16 and test computer 32, and thereby displays results particular to a tested mobile device 20 and test mobile device application 327. If a test is run simultaneously on a plurality of mobile devices 20, the corresponding plurality of test computers 32 send the results to the user computer 60.

In step 150-7, the test computer 32 deletes the test mobile device application 327 from the mobile device 20 through the connection between one of the plurality of second test USB ports 328 and the back side USB port 16B-2 shown in FIG. 9.

The plurality of test mobile device applications 327 that may be executed via each test computer 32 according to the steps above will now be described.

A unit information mobile device application 327-1 queries the model id, product id, International Mobile Station Equipment Identity (IMEI), operating system version, manufacturer information and serial number from the mobile device 20. The mobile device 20 passes the unit information mobile device application 327-1 test if the unit information is obtained.

A cellular test mobile device application 327-2 tests all cellular functionality of the mobile device 20. The cellular test mobile device application 327-2 turns on the cellular connection and disables the wifi in order to force the mobile device 20 to use its cellular connection. When the cellular connection is formed, the cellular test mobile device application 327-2 validates the network type, roaming status, operator name and signal strength. The cellular test mobile device application 327-2 then opens an internet browser and transmits a request to an external website to validate data transfer across the established network connection. The mobile device 20 passes the cellular test mobile device application 327-2 test if, in one attempt, the network name and operator name return non-null values, the roaming status is not active, the signal strength is within a range, and the browser launch returns an acknowledgment.

A Wi-fi test mobile device application 327-3 tests the wi-fi connection of the mobile device 20. The wi-fi test mobile device application 327-3 turns on a wi-fi connection and turns off a cellular connection, then scans for available networks, seeking to connect to the network of wi-fi router 44. Once the network connection is established, wi-fi test mobile device application 327-3 verifies that the mobile device 20 has an IP address and validates the wifi MAC address and RSSI value. The wi-fi test mobile device application 327-3 then opens an internet browser and transmits a request to an external website to validate data transfer across the established network connection. The mobile device 20 passes the wi-fi test mobile device application 327-3 test if the IP address is within the range of 192.168.44.0 through 192.168.44.255, the mobile device 20 is able to connect to a 2.4 GHz and 5 GHz network (for units that supports 5 Ghz), the security status, network name and MAC address are read, the RSSI value is in the range of −100 to 200, the network name is properly identified, and the mobile device 20 is able to launch a browser and go to a web page.

An internal battery test mobile device application 327-4 tests a temperature, charge level, charging source, charging status, battery technology and voltage of a mobile device 20 battery. The mobile device 20 passes the internal battery test mobile device application 327-4 if the temperature of the unit is less than 50 degrees, the battery charge level is greater than 45%, the mobile device application is able to read charging status, technology and charging source, and the voltage is between 0 and 5 volts.

A magnetometer test mobile device application 327-5 tests the functionality of a magnetometer sensor of the mobile device 20. The magnetometer test mobile device application 327-5 reads magnetometer sensor information such as sensor name, vendor name, and maximum range, and validates the sensor coordinates in a fixed environment. The mobile device 20 passes the magnetometer test mobile device application 327-5 if the magnetometer test mobile device application 327-5 is able to read magnetometer sensor data, the maximum range of the magnetometer sensor is within a range, and the position on the x, y, and z-axes is within a range.

A Bluetooth test mobile device application 327-6 tests Bluetooth functionality of the mobile device 20. The Bluetooth test mobile device application 327-6 reads the device name and MAC address. The Bluetooth test mobile device application 327-6 will turn on the Bluetooth and scan for all available devices, sending the available device list back to the test computer 32, which has a Bluetooth dongle. The Bluetooth test mobile device application 327-6 will check the MAC address of the mobile device 20 against a scan list, and if the MAC address is on the list, then the mobile device 20 passes the Bluetooth test mobile device application 327-6. The Bluetooth test mobile device application 327-6 will then turn off the Bluetooth on the mobile device 20.

A front camera test mobile device application 327-7 tests the functionality of a front camera of the mobile device 20. The front camera test mobile device application 327-7 turns on a front camera of the mobile device 20 and the light bars 280, the front camera then takes three images and sends these images to the test computer 32. The images are converted to text using the test computer 32, and if the images all have the keyword "CTDI," the front camera passes the front camera test mobile device application 327-7.

A bottom camera test mobile device application 327-8 tests the functionality of a bottom camera of the mobile device 20. The bottom camera test mobile device application 327-8 turns on the bottom camera and the light bars 280, the bottom camera then takes three images, and sends these images to the test computer 32. The images are converted to text using the test computer 32, and if the images all have the keyword "CTDI," the bottom camera passes the bottom camera test mobile device application 327-8.

A HDMI test mobile device application 327-9 tests the functionality of the HDMI connection to the mobile device 20. The HDMI test mobile device application 327-9 turns on the mobile device screen with 5 keywords located in the corners and center of the mobile device 20. The resultant HDMI data is routed to the audio and audio video connector 346 and the test computer 32, where it is converted to text and analyzed for the keywords. The HDMI connection passes the HDMI test mobile device application 327-9 if the designated keywords appear in the appropriate locations on the mobile device 20 screen.

An audio headset test mobile device application 327-10 tests the functionality of the audio headset of the mobile device 20. The audio headset test mobile device application 327-10 plays an audio with a frequency of 2 khz at three different volume levels—80%, 50% and 30%. The resultant audio data is routed to the audio and audio video connector 346 as shown in FIG. 9, and if the audio frequency and volume levels are validated, the audio headset passes the audio headset test mobile device application 327-10.

A speaker and microphone test mobile device application 327-11 tests a speaker and microphone of the mobile device 20. The speaker and microphone test mobile device application 327-11 plays audio with frequency of 1.2 khz at 40% volume. The microphone will listen to the audio output while the speaker is playing the audio, and once the audio is completed, the saved microphone data is played back through the audio headset and this data is routed to the audio and audio video connector 346. The test computer 32 determines if the audio frequency and volume levels are validated, and if so, the speaker and microphone pass the speaker and microphone test mobile device application 327-11.

A memory test mobile device application 327-12 tests a memory of the mobile device 20 by returning the available memory and total storage space for the mobile device 20. If the memory and storage space of the mobile device 20 is within an appropriate range, the memory passes the memory test mobile device application 327-12.

A time test mobile device application 327-13 tests an internal clock of the mobile device 20 by querying the current time. If the current time of the mobile device 20 is within two minutes of the time on the test computer 32, the internal clock of the mobile device 20 passes the time test mobile device application 327-13.

A SD card test mobile device application 327-14 tests an SD card of the mobile device 20 by writing a file onto the SD card and reading the file back. If the file read back is validated, the SD card passes the SD card test mobile device application 327-14.

A backlight test mobile device application 327-15 tests a backlight of the mobile device 20. The backlight test mobile device application 327-15 turns off the backlight and the image recording device 260 takes an image of the screen of the mobile device 20, sending it to the test computer 32. The backlight test mobile device application 327-15 can also turn on the backlight, and the image recording device 260 takes another image of the screen of the mobile device 20, sending it to the test computer 32. The two images are compared at the test computer 32 to determine whether the backlight is operating properly, and if so, the backlight passes the backlight test mobile device application 327-15.

An ambient light sensor test mobile device application 327-16 tests an ambient light sensor of the mobile device 20. The ambient light sensor test mobile device application 327-16 turns on the light bars 280, and compares an ambient light sensor brightness value to a range. If the value is within an appropriate range, the ambient light sensor passes the ambient light sensor test mobile device application 327-16.

A flash test mobile device application 327-17 tests a flash of the mobile device 20. The flash test mobile device application 327-17 uses the image recording device 260 to take images with the flash turned on and with the flash turned off. The two images are compared at the test computer 32 to determine whether the flash is operating properly, and if so, the flash passes the flash test mobile device application 327-17.

A screen and display test mobile device application 327-17 tests for defective pixels of the display and scratches on the screen of the mobile device 20.

The screen and display test mobile device application 327-17 includes a defective pixel mobile device application to analyze the pixels and the display. The defective pixel mobile device application is a mobile device app in the shown embodiment and includes an algorithm that uses high quality images taken by one or more cameras to identify defective pixels. It is important that each of the pixels of the mobile device 1 needs to be clearly visible for analysis and the changes in the pixel RGB values need to be clearly identified. In particular, in the exemplary embodiment, the defective pixel mobile device application sets the whole display black with a backlight turned ON to a maximum setting. The black display and backlight set to ON combine to illuminate the defective pixel as a white pixel, making any defective pixel readily identifiable in contrast to the surrounding black pixels. The defective pixel mobile device application, in an exemplary embodiment, is a custom Android application, but may be an application that functions on other mobile device operating systems known to those with ordinary skill in the art.

The mobile device 1 is manually positioned on a retention device 22 with the display facing upward and way from the retention device 22. The retention device 22 is then positioned in the mobile device testing apparatus 10, for instance, using a sliding shelf. The mobile device testing apparatus 10 is then closed and sealed from exterior light. The pair of cameras are positioned facing the display from a top of the mobile device testing apparatus 10, as shown in FIG. 4.

In an exemplary embodiment of the invention, the method and system for detecting defective pixels and screen imperfections of a mobile device 1 uses a two camera system for large screens, such as tablet screens, so that the pixels of the mobile device 1 are clearly visible for analysis. However, for mobile devices having smaller screens, such as mobile phones, the method and system for detecting defective pixels and screen imperfections of a mobile device 1 may use a one camera system.

In the shown embodiment, the method and system can detect changes in the pixel RGB values using a two camera system, as shown in FIG. 4. The first camera is positioned to capture and image of a top portion of the display, while the second camera is positioned to capture an image of a bottom portion of the display. The first camera is positioned side by side with the second camera. The use of a two camera system makes defective pixels clearly visible when captured images are analyzed using the system and method described below.

Images captured by both the first camera and the second camera are performed in a dark environment to avoid external light reflections, which could cause false defects when using the method and system for detecting defective pixels and screen imperfections according to the invention.

In an exemplary embodiment, the resolution of the cameras is 5 MP, as the defective pixels need to appear significantly different in comparison to other pixels at this resolution. A 15 MP or higher resolution camera cannot be used because, as the resolution of the camera gets higher, the change of RGB values decreases as these changes are spread across more pixels. As the RGB values variance decreases, it becomes increasingly difficult to identify defects.

Table 1 below shows the comparison of the resolution of the camera versus the resolution of the mobile device 1 (5:1) in an exemplary embodiment of the invention. Table 1 shows that the first camera captures about 5 million pixels in which the display crop area is 2 million pixels and the pixels that fall into the camera view is 0.33 million pixels. The second camera captures another 5 million pixels in which the display crop area is 1.67 million pixels and the pixels that fall into the camera view is 0.31 million pixels. This correlates to a total of approximately 3.5 million pixels of the captured image corresponds to 0.64 million pixels on the actual display of the mobile device 1. This means 1 pixel on the display of the mobile device 1 corresponds to approximately 5 pixels on the actual captured image taken by the cameras.

TABLE 1

Exemplary Camera Pixel ratio comparison to Tablet

|  | HD Camera | Tablet |
| --- | --- | --- |
| 1$^{st}$ Camera Resolution | 2590 × 1942 (5 million Pixels) |  |
| 2$^{nd}$ Camera Resolution | 2590 × 1942 (5 million Pixels) |  |
| Display Area resolution for Top Section of Display (Camera) | 1200 × 1720 (2 million Pixels) | 560 × 600 (.33 million Pixels) |
| Display Area resolution for Bottom Section of Display (Camera) | 1200 × 1395 (1.67 million Pixels) | 520 × 600 (.31 million Pixels) |
| Total Pixel ratio | 3.5 million Pixels (5:1) | .64 million Px |

After the mobile device 1 is positioned in the mobile device testing apparatus 10, the defective pixel mobile device application commands the mobile device 1 to make the display black with backlight turned ON to a maximum setting. The first camera captures a first image of the top section of the display and the second camera captures a second image of the bottom section of the display. In general, the first image and the second image are then analyzed for any sudden drastic changes in the intensity of light across the black display. Any changes are recorded and are compared against a set of parameters that will determine if the RGB value falls under damaged pixel criterion or a good pixel criterion, as will be described in more detail below.

In general, each captured image is analyzed to find any defective pixels and then analyzed to determine if the defective pixel is large enough to be considered as a failure. If it falls into fail criteria, a circle is applied around the defective pixel to visually show the location of the defective pixel in the captured image. The same analysis is conducted for captured images of both the top and bottom sections of the display using the first camera and the second camera. An overlap area is also considered.

A defective pixel detection analysis of the method and system for detecting defective pixels and screen imperfections will be described in more detail.

Firstly, the captured images of the top and bottom sections of the display are analyzed and cropped to the display size by a computer which then runs several steps to perform a defective pixel Each captured image from the first camera and the second camera is a photographic representation of rows and columns of pixels of the display, for instance an LED display, and each pixel is made of Red, Green and Blue values (RGB values) in the shown embodiment. However, one skilled in the art should appreciate that the method could be easily applied to other color models, including CMYK.

In the shown embodiment, and according to the invention, the RGB values vary from 0-255. For example, a pure white pixel color has values of R=255, G=255 and B=255, and a pure black pixel color has values of R=0, G=0 and B=0.

The RGB value of the questionable pixels will have values of R&B greater than 30 or R&G greater than 30 or B&G greater than 30; the questionable pixels that are illuminated are made up of mixed colors, in which at least two of the R, G and B have values greater than 30. The non-questionable pixel categories are eliminated at the initial stage of analysis. The questionable pixels undergo a more detailed criteria check step to determine if they exhibit a drastic change from the 8 surrounding pixels.

The criteria check step is performed by comparing the questionable pixels against 8 surrounding pixels. In the event more than 4 of the surrounding pixels show a significant variance from the questionable pixel, then the questionable pixel is categorized as a drastic change pixel. All the questionable pixels are analyzed in this method and grouped within a 15×15 pixel range. If there are more than 5 drastic change pixels in one group, then it shows that there is a defective pixel in the mobile device 1 which is then considered a failure.

A pixel is considered questionable if it shows a drastic change when compared to adjacent pixels. A drastic change is defined as a drastic change in RGB values for the questionable pixel when compared to 8 surrounding pixels. If any of the RGB value changes should be above 25, and if the other 2 values are greater than 3, then it is considered a questionable pixel.

In an exemplary embodiment of the invention, shown in FIGS. 16 and 17, the difference of R, G, and B values are calculated by comparing all the 8 surrounding pixels against a center pixel. After finding the differences, each set of RGB values is then checked to see if the difference of one of them changed by a value of at least 25, and if one of the 2 values should be greater than 3. This indicates that there is a drastic change. In the below example, FIG. 16, 6 out of 8 surrounding pixels marked in red falls into that criterion. Since it is higher than the set limit of 4, the center pixel is considered a questionable pixel. This analysis is conducted for all the pixels for which at least two of the R, G and B have values greater than 30.

Figure 18:
FIG. 18 is table showing actual RGB values of a good pixel in the exemplary embodiment of the invention.
Figure 19:
FIG. 19 is table showing the difference of RGB values compared to center of a good pixel in the exemplary embodiment of the invention.

A pixel is considered good if it does not show a drastic change. A drastic change is defined as a significant variance in RGB values compared to 8 surrounding pixels. In order to be a good pixel, the variance in any RGB value must be below 25 as compared to the 8 surrounding pixels under analysis. In the event one value is greater than 25, then each of the remaining 2 values must have a variance below 3. FIGS. 18 and 19 show the analysis of a good pixel.

Next, questionable pixels are grouped within a 15×15 pixel range. This is grouped to find a defect in a damaged area. Up to four questionable pixels within a 15×15 pixel range in the captured picture is acceptable, since this equates to less than one defective pixel on the display. Five or more questionable pixels within a 15×15 pixel range in the camera picture will be categorized as a defective pixel. A few examples of a pixel damage group are shown in Table 2.

TABLE 2

Example of 3 Defective Pixel Groups - More than 4 questionable pixels in a 10 × 10 range

| Group #1: 8 Questionable Pixels | | | | |
|---|---|---|---|---|
| X: 385 | Y: 1036 | R: 45 | G: 21 | B: 34 |
| X: 384 | Y: 1037 | R: 74 | G: 52 | B: 38 |
| X: 385 | Y: 1037 | R: 44 | G: 33 | B: 67 |
| X: 386 | Y: 1037 | R: 33 | G: 22 | B: 56 |
| X: 384 | Y: 1038 | R: 65 | G: 64 | B: 44 |
| X: 385 | Y: 1038 | R: 23 | G: 50 | B: 67 |
| X: 384 | Y: 1039 | R: 64 | G: 40 | B: 36 |
| X: 385 | Y: 1039 | R: 24 | G: 41 | B: 49 |
| Group #2: 16 Questionable Pixels | | | | |
| X: 265 | Y: 359 | R: 56 | G: 35 | B: 42 |
| X: 266 | Y: 359 | R: 59 | G: 38 | B: 45 |
| X: 267 | Y: 359 | R: 26 | G: 46 | B: 53 |
| X: 265 | Y: 360 | R: 99 | G: 46 | B: 42 |
| X: 266 | Y: 360 | R: 109 | G: 56 | B: 52 |
| X: 267 | Y: 360 | R: 116 | G: 70 | B: 55 |
| X: 268 | Y: 360 | R: 98 | G: 52 | B: 37 |
| X: 265 | Y: 361 | R: 100 | G: 69 | B: 48 |
| X: 266 | Y: 361 | R: 113 | G: 82 | B: 61 |
| X: 267 | Y: 361 | R: 114 | G: 113 | B: 85 |
| X: 268 | Y: 361 | R: 94 | G: 93 | B: 65 |
| X: 265 | Y: 362 | R: 37 | G: 57 | B: 46 |
| X: 266 | Y: 362 | R: 71 | G: 91 | B: 80 |
| X: 267 | Y: 362 | R: 113 | G: 135 | B: 86 |
| X: 268 | Y: 362 | R: 102 | G: 124 | B: 75 |
| X: 269 | Y: 362 | R: 17 | G: 59 | B: 45 |
| Group #3: 7 Questionable Pixels | | | | |
| X: 372 | Y: 1488 | R: 41 | G: 53 | B: 51 |
| X: 373 | Y: 1488 | R: 55 | G: 56 | B: 40 |
| X: 374 | Y: 1488 | R: 40 | G: 41 | B: 25 |
| X: 373 | Y: 1489 | R: 55 | G: 107 | B: 58 |
| X: 374 | Y: 1489 | R: 40 | G: 92 | B: 43 |
| X: 373 | Y: 1490 | R: 28 | G: 75 | B: 57 |
| X: 374 | Y: 1490 | R: 25 | G: 72 | B: 54 |

Table 2 shows that group #1 has 8 questionable pixels which correspond to approximately 2 defective pixels in one area on the tablet. Group #2 has 16 questionable pixels that correspond to 3 defective pixels in another area. Group #3 has 7 questionable pixels which correspond to approximately 2 defective pixels in another area of the tablet.

The screen and display test mobile device application 327-17 further includes a scratch detection mobile device application to analyze scratches to the display of the mobile device 1. The scratch detection mobile device application is also a mobile device app and includes an algorithm that uses a high quality images taken by one or more cameras to identify defective pixels. In particular, in the exemplary embodiment, the scratch detection mobile device application sets the whole display white with backlight turned ON to a maximum setting. The scratch detection mobile device application can be loaded with the pixel detection mobile device application, as a single application, or separately. The scratch detection mobile device application, in an exemplary embodiment, is a custom Android application, but may be an application that functions on other mobile device operating systems known to those with ordinary skill in the art.

If the scratch detection mobile device application is loaded separately, the mobile device 1 is again manually positioned on a retention device 22 with the display facing upward and way from the retention device 22. The retention device 22 is then positioned in the mobile device testing apparatus 10. The mobile device testing apparatus 10 is then closed and sealed from exterior light. The pair of cameras are positioned from a top of the mobile device testing apparatus 10 and face the display, as shown in FIG. 4.

A captured image for analysis is taken with a white background loaded on the display of the mobile device. White color enhances the visibility of the scratches and any defects on top of the screen are clearly visible for analysis.

In order to confirm the defective screen, a computer performs various image processing steps on captured images by the first camera and the second camera. These steps are described below.

Firstly, the pixels of the captured images are grouped. In an exemplary embodiment, each captured image is divided into small group of 8×8 pixel groupings (64 pixels). The standard deviation of RGB value for the whole group of 64 pixels is calculated and used in the next step.

Next, if the standard deviation of the RGB value for the whole group of 64 pixels is above a deviation threshold, it is determined that the group of 64 pixels includes a defective pixel and is represented by a single pixel with white color. If the standard deviation of the whole group of 64 pixels is below the deviation threshold, then the whole group of 64 pixels is considered a good pixel and is represented by a single pixel of black color. In an exemplary embodiment, the threshold is calculated by:

$$[RGB \text{ value} - RGB \text{ value for the whole group (i.e. 64 pixels)}] < \text{Standard Deviation } s = 8 \quad \text{Equation 1:}$$

The analysis is done for all the 8×8 pixel groupings (64 pixels) of the captured image, and then the captured image with these 8×8 pixel groupings (64 pixels) is represented by an grouped image ($1/64^{th}$ in size to the captured image) with each pixel of the grouped image representing a 8×8 pixel grouping (64 pixels) of the captured image.

The grouped image is then converted to gray scale for further analysis.

Next, the grayscale converted image is applied with a grayscale spec map to make the grayscale converted image more clear for analysis.

The grayscale converted image, with an applied grayscale spec map applied, is then dilated to join the nearby dots together. When the nearby dots are joined together, any scratches to the screen will be visible. The grayscale converted image is then dilated again to make the distant dots join together. The grayscale converted image is then dilated once again in the process of image analysis.

Next, the grayscale converted image, which has been dilated three times and a grayscale spec map applied, is inverted. As a result, the white pixels are converted to black and the black pixels are converted to white so that a filter analysis can be performed.

Next, the inverted image is then filtered to eliminate small artifacts that have zero consequence as part of the analysis. The filtering size can be adjusted to find scratches with various lengths or defects on the screen of the mobile device 1.

A final image is prepared from the filtered image. This is performed by inverting the filtered image. The final image is then analyzed for scratch detection of the screen of the mobile device 1.

Finally, the final image is analyzed by the computer and checked for RGB values to find if there are any white pixels in the final image. If a white pixel is found, the scratch detection analysis identifies a scratch on the screen of the mobile device 1.

Advantageously, the mobile device testing apparatus 10 of the claimed invention permits a plurality of mobile devices 20 to be simultaneously tested using a range of test mobile device applications 327. Testing efficiency is thus increased, saving time and decreasing tester costs.

The foregoing illustrates some of the possibilities for practicing the invention. Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. An apparatus for simultaneously testing a plurality of mobile devices, comprising:
    a frame housing a plurality of device cabinets, a plurality of test cabinets, and a control cabinet;
    a plurality of retention devices disposed in the plurality of device cabinets;
    a plurality of test computers disposed in the plurality of test cabinets, wherein each test computer comprises a processor and a non-transitory computer readable storage medium storing a plurality of mobile device test applications;
    a plurality of mobile devices, each disposed on one of the plurality of retention devices and electrically connected to one of the plurality of test computers and receiving one of the plurality of mobile device test applications; and
    a control computer disposed in the control cabinet and electrically connected to the plurality of test computers and receiving test results of the plurality of mobile devices from one of the plurality of mobile device test applications.

2. The apparatus of claim 1, wherein the plurality of test computers corresponds to the plurality of device cabinets.

3. The apparatus of claim 1, wherein a number of test cabinets is different than a number of device cabinets.

4. The apparatus of claim 1, further comprising a plurality of monitors corresponding to the plurality of device cabinets.

5. The apparatus of claim 1, further comprising a user computer electrically connected to the plurality of test computers and receiving test results of the plurality of mobile devices from one of the plurality of test mobile device applications.

6. The apparatus of claim 1, wherein each one of the plurality of retention devices comprises a connection assembly for electrically connecting to a mobile device.

7. The apparatus of claim 1, wherein each device cabinet comprises an image recording device.

8. The apparatus of claim 7, wherein each device cabinet further comprises an illuminating element.

9. The apparatus of claim 8, wherein the illuminating element is selected from the group consisting of: a light emitting diode, an incandescent light, a fluorescent light, and combinations thereof.

10. The apparatus of claim 8, wherein the illuminating element is electrically connected to one of the plurality of test computers.

11. The apparatus of claim 1, wherein each device cabinet further comprises a microphone.

12. The apparatus of claim 1, wherein each device cabinet further comprises a speaker.

13. The apparatus of claim 1, wherein each device cabinet further comprises a camera test pattern.

14. A method for simultaneously testing a plurality of mobile devices, comprising:
    providing a frame, a plurality of device cabinets, a plurality of retention devices, a plurality of test cabinets, a plurality of test computers, a control cabinet, and a control computer, wherein:
        the frame houses the plurality of device cabinets, the plurality of test cabinets, and the control cabinet,
        each of the plurality of device cabinets comprises one of the plurality of retention devices,
        each of the plurality of test cabinets comprises one of the plurality of test computers,
        each of the plurality of test computers comprises a processor and a non-transitory computer readable storage medium storing a plurality of mobile device test applications, and
        the control cabinet comprises the control computer;
    disposing a plurality of mobile devices such that each is disposed on one of the plurality of retention devices;
    electrically connecting the plurality of disposed mobile devices such that each is electrically connected to one of the plurality of test computers,
    electrically connecting the plurality of test computers to the control computer;
    loading a first one of the plurality of mobile device test applications from a first test computer of the plurality of test computers to a first mobile device of the plurality of disposed mobile devices;
    loading a second one of the plurality of mobile device test applications from a second test computer of the plurality of test computers to a second mobile device of the plurality of disposed mobile devices; and
    receiving test results for the first one and the second one of the plurality of mobile device test applications from the first one and the second one of the plurality of disposed mobile devices.

15. The method of claim 14, wherein a number of test cabinets is different than a number of device cabinets.

16. The method of claim 14, wherein the frame further comprises a plurality of monitors.

17. The method of claim 14, wherein the frame further comprises a user computer electrically connected to each of the plurality of test computers.

18. The method of claim 17, wherein the test results are received at the user computer.

19. The method of claim 14, wherein each of the plurality of device cabinets further comprises an image recording device.

20. The method of claim 14, wherein each of the plurality of device cabinets further comprises an illuminating element.

21. The method of claim 20, wherein the illuminating element is electrically connected to one of the plurality of test computers.

22. The method of claim 14, wherein each of the plurality of device cabinets further comprises a microphone.

23. The method of claim 14, wherein each of the plurality of device cabinets further comprises a speaker.

24. The method of claim 14, wherein each of the plurality of device cabinets further comprises a camera test pattern.

* * * * *